United States Patent
Onodera et al.

(10) Patent No.: US 12,249,467 B2
(45) Date of Patent: Mar. 11, 2025

(54) ELECTRONIC COMPONENT

(71) Applicant: TDK CORPORATION, Tokyo (JP)

(72) Inventors: Shinya Onodera, Tokyo (JP); Akitoshi Yoshii, Tokyo (JP); Kyohei Takata, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days.

(21) Appl. No.: 18/733,322

(22) Filed: Jun. 4, 2024

(65) Prior Publication Data

US 2024/0321521 A1    Sep. 26, 2024

Related U.S. Application Data

(62) Division of application No. 17/559,552, filed on Dec. 22, 2021.

(30) Foreign Application Priority Data

Dec. 28, 2020    (JP) ................. 2020-219273

(51) Int. Cl.
*H01G 4/30* (2006.01)
*H01G 4/008* (2006.01)
(Continued)

(52) U.S. Cl.
CPC ............ *H01G 4/30* (2013.01); *H01G 4/008* (2013.01); *H01G 4/012* (2013.01); *H01G 4/232* (2013.01)

(58) Field of Classification Search
CPC ........ H01G 4/008; H01G 4/012; H01G 4/232; H01G 4/30
See application file for complete search history.

(56) References Cited

U.S. PATENT DOCUMENTS

2011/0001399 A1    1/2011  Oguni et al.
2013/0170095 A1    7/2013  Oh et al.
(Continued)

FOREIGN PATENT DOCUMENTS

JP    2003-263922 A    9/2003
JP    2011-014698 A    1/2011
(Continued)

OTHER PUBLICATIONS

Aug. 1, 2024 U.S. Office Action issued in U.S. Appl. No. 17/559,552.
(Continued)

*Primary Examiner* — Nathan Milakovich
(74) *Attorney, Agent, or Firm* — Oliff PLC

(57) ABSTRACT

A plurality of external electrodes are disposed on both ends of an element body. Each of the plurality of external electrodes includes a pair of electrode portions disposed on a pair of side surfaces and including a conductive resin layer. For each of the two conductive resin layers located on the same side surface, one conductive resin layer includes an edge opposing another conductive resin layer. The conductive resin layer includes a first region and a second region. The first region included a plurality of metal particles of a first content and a resin. The second region includes a plurality of metal particles of a second content smaller than the first content and a resin. The second region is located closer to the edge of the conductive resin layer than the first region, and includes the edge of the conductive resin layer.

7 Claims, 33 Drawing Sheets

(51) Int. Cl.
*H01G 4/012* (2006.01)
*H01G 4/232* (2006.01)

(56) References Cited

U.S. PATENT DOCUMENTS

| | | | |
|---|---|---|---|
| 2021/0125783 | A1 | 4/2021 | Onodera et al. |
| 2021/0272740 | A1* | 9/2021 | Wakabayashi ...... H01F 27/2804 |
| 2022/0084752 | A1 | 3/2022 | Kato |
| 2022/0084753 | A1 | 3/2022 | Onodera et al. |
| 2022/0375689 | A1 | 11/2022 | Onodera et al. |
| 2023/0230742 | A1* | 7/2023 | Nagai ..................... H01F 1/36 |
| | | | 336/200 |
| 2024/0249889 | A1* | 7/2024 | Mishima ................ H01G 4/008 |
| 2024/0321521 | A1 | 9/2024 | Onodera et al. |

FOREIGN PATENT DOCUMENTS

| | | |
|---|---|---|
| JP | 2015-029009 A | 2/2015 |
| JP | 2018-006501 A | 1/2018 |
| JP | 2020-72246 A | 5/2020 |
| KR | 10-2019-0055187 A | 5/2019 |

OTHER PUBLICATIONS

Nov. 7, 2024 U.S. Office Action issued in U.S. Appl. No. 17/559,552.

* cited by examiner

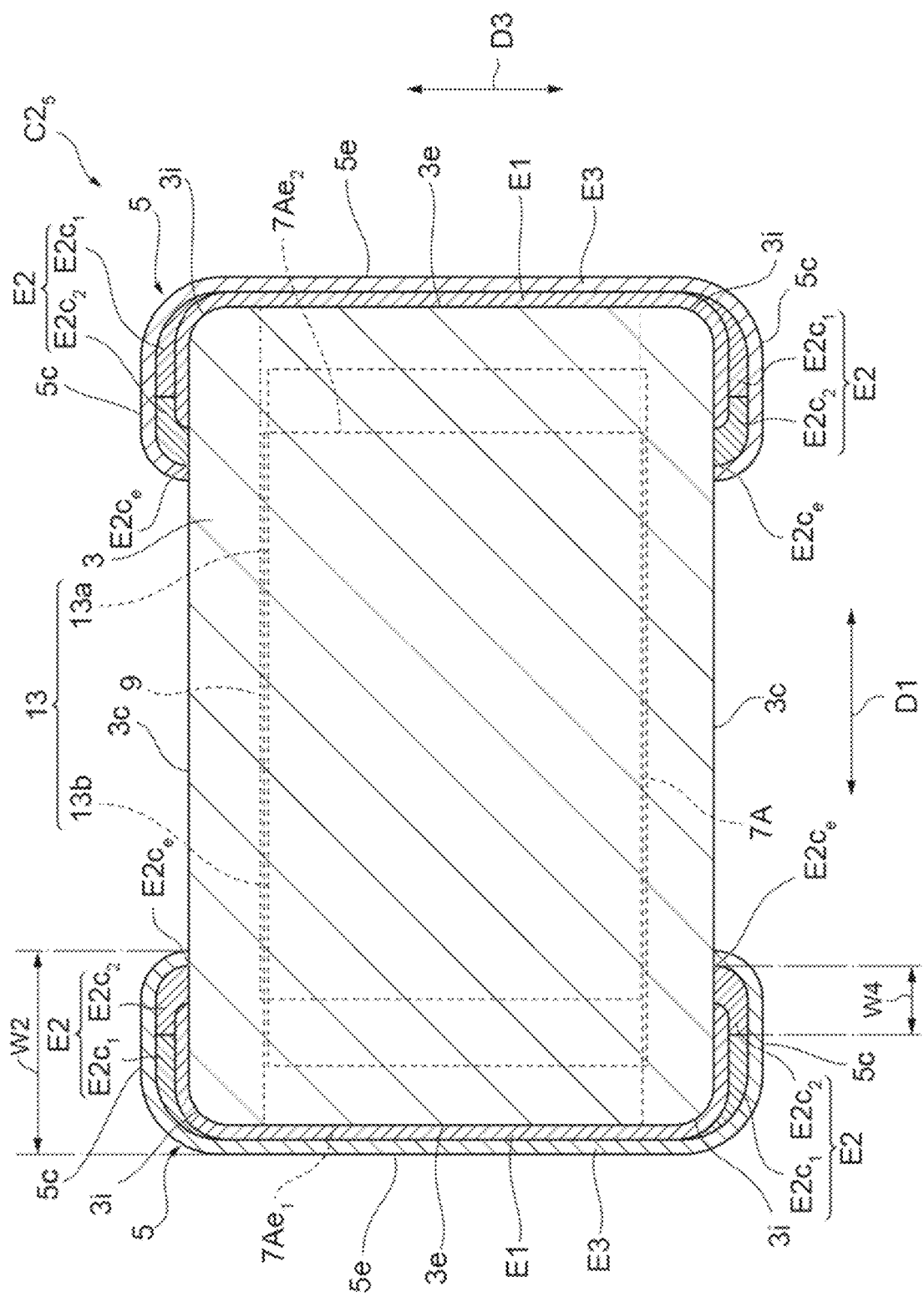

ELECTRONIC COMPONENT

This application is a Divisional of application Ser. No. 17/559,552, filed Dec. 22, 2021, which claims priority to Japanese Application No. 2020-219273 filed Dec. 28, 2020. The entire disclosures of the prior applications are hereby incorporated by reference herein their entirety.

BACKGROUND OF THE INVENTION

1. Field of the Invention

The present invention relates to an electronic component.

2. Description of Related Art

Known electronic components include an element body of a rectangular parallelepiped shape, a plurality of external electrodes, and a plurality of internal electrodes (see, for example, Japanese Unexamined Patent Publication No. 2018-006501). The element body includes a pair of end surfaces opposing each other in a first direction, a pair of first side surfaces opposing each other in a second direction, and a pair of second side surfaces opposing each other in a third direction. The plurality of external electrodes are disposed on both ends of the element body in the first direction. The plurality of internal electrodes are disposed in the element body to be distributed in the second direction, and are electrically connected to corresponding external electrodes of the plurality of external electrodes. Each external electrode includes an electrode portion that is disposed on the second side surface and includes a conductive resin layer.

SUMMARY OF THE INVENTION

The conductive resin layer generally includes a plurality of metal particles and a resin. In a configuration in which the external electrode includes a conductive resin layer, migration may occur in the external electrode. Migration is considered to occur due to the following events, for example.

An electric field generated between the internal electrode and the conductive resin layer to which the internal electrode is not electrically connected acts on the metal particle, and an atom of the metal particle is ionized. Generated metal ions are attracted by an electric field generated between the external electrodes and migrates from the conductive resin layer. The metal ions migrating from the conductive resin layer react with, for example, an electron supplied from the element body, and is deposited as metal on the surface of the element body.

An object of each of aspects of the invention is to provide an electronic component controlling occurrence of migration even when an external electrode includes a conductive resin layer.

An electronic component according to one aspect of the invention includes an element body of a rectangular parallelepiped shape, a plurality of external electrodes, a plurality of internal electrodes, and an insulating film disposed on the element body. The element body includes a pair of end surfaces opposing each other in a first direction, a pair of first side surfaces opposing each other in a second direction, and a pair of second side surfaces opposing each other in a third direction. The plurality of external electrodes are disposed on both ends of the element body in the first direction. The plurality of internal electrodes are disposed in the element body to be distributed in the second direction, and is electrically connected to corresponding external electrodes of the plurality of external electrodes. Each of the plurality of external electrodes includes a pair of first electrode portions disposed on the pair of second side surfaces and including a conductive resin layer. Each of the pair of second side surfaces includes a region exposed from the external electrode. The insulating film includes film portions disposed on the pair of second side surfaces. Each of the film portions covers an edge of the conductive resin layer and the region of each of the second side surfaces along the edge of the conductive resin layer.

In the one aspect described above, the film portion of the insulating film covers the edge of the conductive resin layer included in the first electrode portion. Therefore, metal ions tend not to migrate from the conductive resin layer of the first electrode portion even in a case where the metal ions are generated in the conductive resin layer of the first electrode portion due to an electric field generated between the internal electrode and the conductive resin layer of the first electrode portion not electrically connected to the internal electrode. The film portion of the insulating film regulates migration of the metal ions. Consequently, the one aspect controls occurrence of the migration.

In the one aspect described above, each of the plurality of external electrodes may include a pair of second electrode portions disposed on the pair of first side surfaces and including a conductive resin layer. Each of the pair of first side surfaces may include a region exposed from the external electrode. The insulating film may include other film portions disposed on the pair of first side surfaces. Each of the other film portions may cover an edge of the conductive resin layer included in the second electrode portion and the region of each of the first side surfaces along the edge of the conductive resin layer included in the second electrode portion.

In a configuration in which the insulating film includes the other film portion, the other film portion covers the edge of the conductive resin layer included in the second electrode portion. Therefore, metal ions tend not to migrate from the conductive resin layer of the second electrode portion even in a case where the metal ions are generated in the conductive resin layer of the second electrode portion due to an electric field generated between an outermost internal electrode and the conductive resin layer of the second electrode portion not electrically connected to the outermost internal electrode. The other film portion regulates migration of the metal ions. The outermost internal electrode is located outermost in the second direction among the plurality of internal electrodes. Consequently, the configuration in which the insulating film includes the other film portion further controls the occurrence of the migration.

In the one aspect described above, the conductive resin layer may include a plurality of silver particles.

An electronic component according to another aspect of the invention includes an element body of a rectangular parallelepiped shape, a plurality of external electrodes, and a plurality of internal electrodes. The element body includes a pair of end surfaces opposing each other in a first direction, a pair of first side surfaces opposing each other in a second direction, and a pair of second side surfaces opposing each other in a third direction. The plurality of external electrodes are disposed on both ends of the element body in the first direction. The plurality of internal electrodes are disposed in the element body to be distributed in the second direction, and are electrically connected to corresponding external electrodes of the plurality of external electrodes. Each of the plurality of external electrodes includes a pair of first electrode portions disposed on the pair of second side surfaces and including a conductive resin layer. For each of the two conductive resin layers located on the same second side surface, one conductive resin layer includes an edge opposing another conductive resin layer. The conductive resin layer includes: a first region including a plurality of metal particles of a first content and a resin; and a second region including a plurality of metal particles of a second content and a resin. The second content is smaller than the first content. The second region is located closer to the edge of the conductive resin layer than the first region, and includes the edge of the conductive resin layer.

In the other aspect described above, the second region constitutes the edge of the conductive resin layer included in the first electrode portion. The content of the plurality of metal particles in the second region is smaller than the content of the plurality of metal particles in the first region. An amount of metal ions generated in the second region is smaller than that in the first region even in a case where the metal ions are generated in the conductive resin layer of the first electrode portion due to an electric field generated between the internal electrode and the conductive resin layer of the first electrode portion not electrically connected to the internal electrode. Therefore, an amount of the metal ions migrating from the conductive resin layer of the first electrode portion in the configuration in which the conductive resin layer of the first electrode portion includes the second region is small, as compared with that in the configuration in which the conductive resin layer of the first electrode portion includes only the first region. Consequently, the other aspect described above controls occurrence of migration.

In the other aspect described above, each of the plurality of external electrodes may include a pair of second electrode portions disposed on the pair of first side surfaces and including a conductive resin layer. For each of the two conductive resin layers located on the same first side surface, one conductive resin layer may include an edge opposing another conductive resin layer. The conductive resin layer included in the second electrode portion may include: a third region including a plurality of metal particles of a third content and a resin; and a fourth region including a plurality of metal particles of a fourth content and a resin. The fourth region may be located closer to the edge of the conductive resin layer than the third region and include the edge of the conductive resin layer. In this case, the fourth content is smaller than the third content.

In a configuration in which the conductive resin layer included in the second electrode portion includes the fourth region, the fourth region constitutes the edge of the conductive resin layer included in the second electrode portion. The content of the plurality of metal particles in the fourth region is smaller than the content of the plurality of metal particles in the third region. An amount of metal ions generated in the fourth region is small, as compared with that in the third region even in a case where the metal ions are generated in the conductive resin layer of the second electrode portion due to an electric field generated between an outermost internal electrode and the conductive resin layer of the second electrode portion not electrically connected to the outermost internal electrode. Therefore, an amount of metal ions migrating from the conductive resin layer of the second electrode portion in the configuration in which the conductive resin layer of the second electrode portion includes the fourth region is small, as compared with that in the configuration in which the conductive resin layer of the second electrode portion includes only the third region. The outermost internal electrode is located outermost in the second direction among the plurality of internal electrodes. Consequently, the configuration in which the conductive resin layer of the second electrode portion includes the fourth region further controls the occurrence of the migration.

In another aspect described above, the metal particles may include silver particles.

In each of the aspects described above, each of the plurality of external electrodes may include a pair of second electrode portions disposed on the pair of first side surfaces and including a conductive resin layer. For each of the two conductive resin layers located on the same first side surface, one conductive resin layer may include an edge opposing another conductive resin layer. An outermost internal electrode may be adjacent in the second direction to the second electrode portion to which the outermost internal electrode is electrically connected. A first length of the outermost internal electrode in the first direction from a reference plane may be larger than a second length in the first direction from the reference plane to the edge of the conductive resin layer electrically connected to the outermost internal electrode and included in the second electrode portion, and smaller than a third length from the reference plane to the edge of the conductive resin layer not electrically connected to the outermost internal electrode and included in the second electrode portion. In this case, the outermost internal electrode is located outermost in the second direction among the plurality of internal electrodes. The reference plane includes the end surface to which the outermost internal electrode is exposed.

In a configuration in which the first length is larger than the second length, the internal electrode adjacent to the outermost internal electrode in the second direction and the conductive resin layer included in the second electrode portion adjacent to the same outermost internal electrode in the second direction are not electrically connected to each other, and tend not to oppose each other in the second direction. An electric field tends not to be generated between the conductive resin layer and the internal electrode that are not electrically connected to each other.

In a configuration in which the first length is smaller than the third length, the outermost internal electrode tends not to oppose the conductive resin layer included in the second electrode portion not electrically connected to the outermost internal electrode, in the second direction. An electric field tends not to be generated between the conductive resin layer and the outermost internal electrode that are not electrically connected to each other.

Consequently, the configuration in which the first length is larger than the second length and smaller than the third length further controls the occurrence of the migration.

Each of the aspects described above may include a dummy conductor located in the same layer as the outermost internal electrode and separated from the outermost internal electrode. The dummy conductor may be electrically connected to the external electrode to which the outermost internal electrode located in the same layer as the dummy conductor is not electrically connected.

In the configuration in which the dummy conductor is located in the same layer as the outermost internal electrode, structural defects tend not to occur in the element body.

Each of the aspects described above may include a pair of dummy conductors. In this case, each of the pair of dummy conductors is adjacent to a corresponding first side surface of the pair of first side surfaces in the second direction. Each of the plurality of external electrodes may include a pair of second electrode portions disposed on the pair of first side surfaces and including a conductive resin layer. Each of the pair of dummy conductors may oppose the conductive resin layer not electrically connected the internal electrode adjacent to the dummy conductor in the second direction and included in the second electrode portion, in the second direction.

In a configuration including the dummy conductor, the dummy conductor is located between the conductive resin layer included in the second electrode portion and the internal electrode not electrically connected to the conductive resin layer of the second electrode portion. The dummy conductor separates the conductive resin layer of the second electrode portion from the internal electrode not electrically connected to the conductive resin layer of the second electrode portion. Therefore, an electric field tends not to be generated between the conductive resin layer of the second electrode portion and the internal electrode not electrically connected to the conductive resin layer of the second electrode portion. Even in a case where an electric field is generated between the conductive resin layer of the second electrode portion and the internal electrode not electrically connected to the conductive resin layer of the second electrode portion, strength of the electric field is small. Consequently, the configuration including the dummy conductor further controls the occurrence of the migration.

In each of the aspects described above, each of the plurality of external electrodes may include an electrode portion disposed on the end surface and including a conductive resin layer.

A configuration in which the external electrode includes the electrode portion disposed on the end surface and including the conductive resin layer reduces stress acting on a solder fillet formed on the electrode portion, and then controls occurrence of solder cracks.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 33 is a view illustrating a cross-sectional configuration of the multilayer capacitor according to the modification of the second embodiment.

DETAILED DESCRIPTION OF EMBODIMENTS

Figure 1:
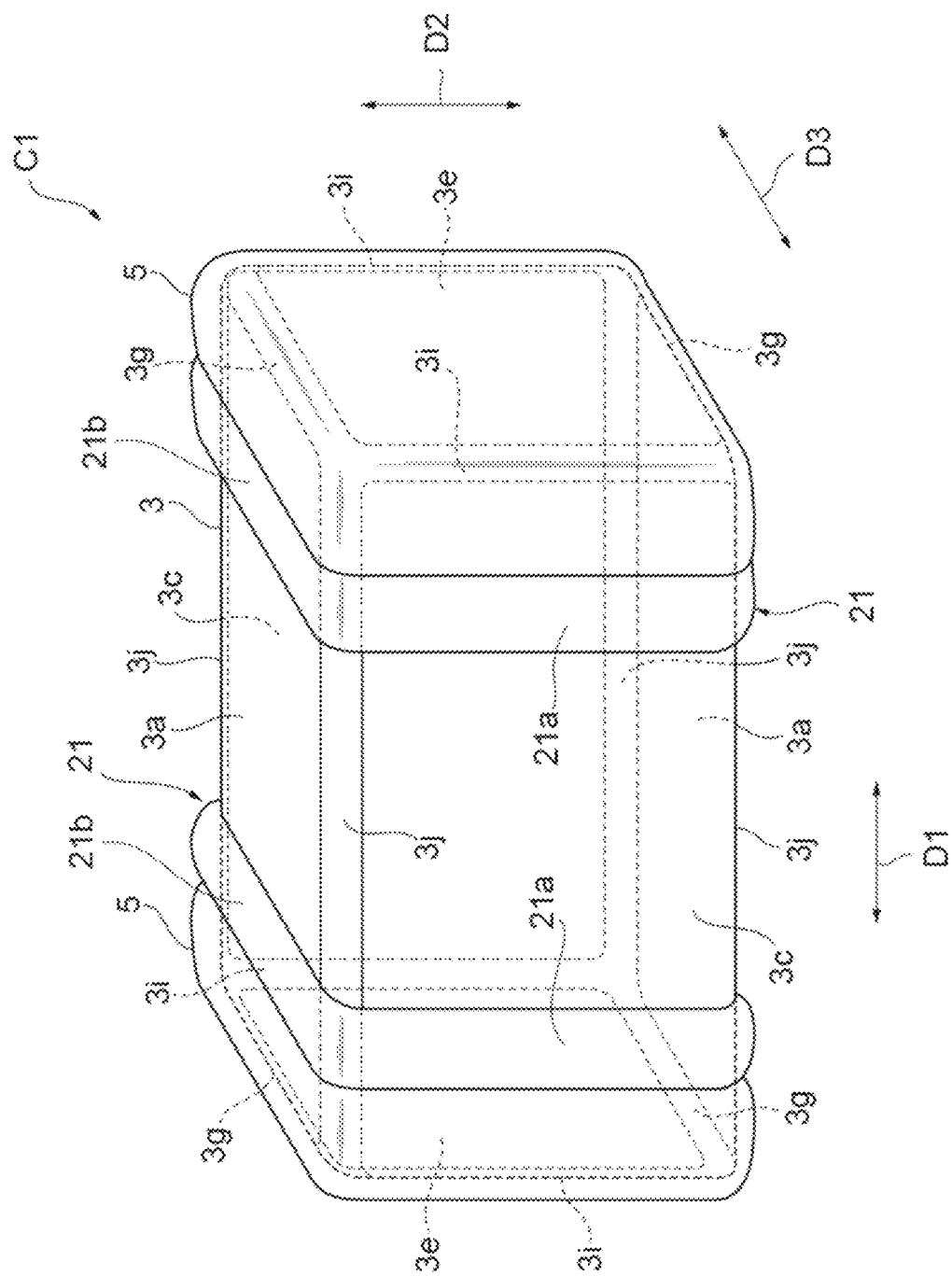
FIG. 1 is a perspective view of a multilayer capacitor according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
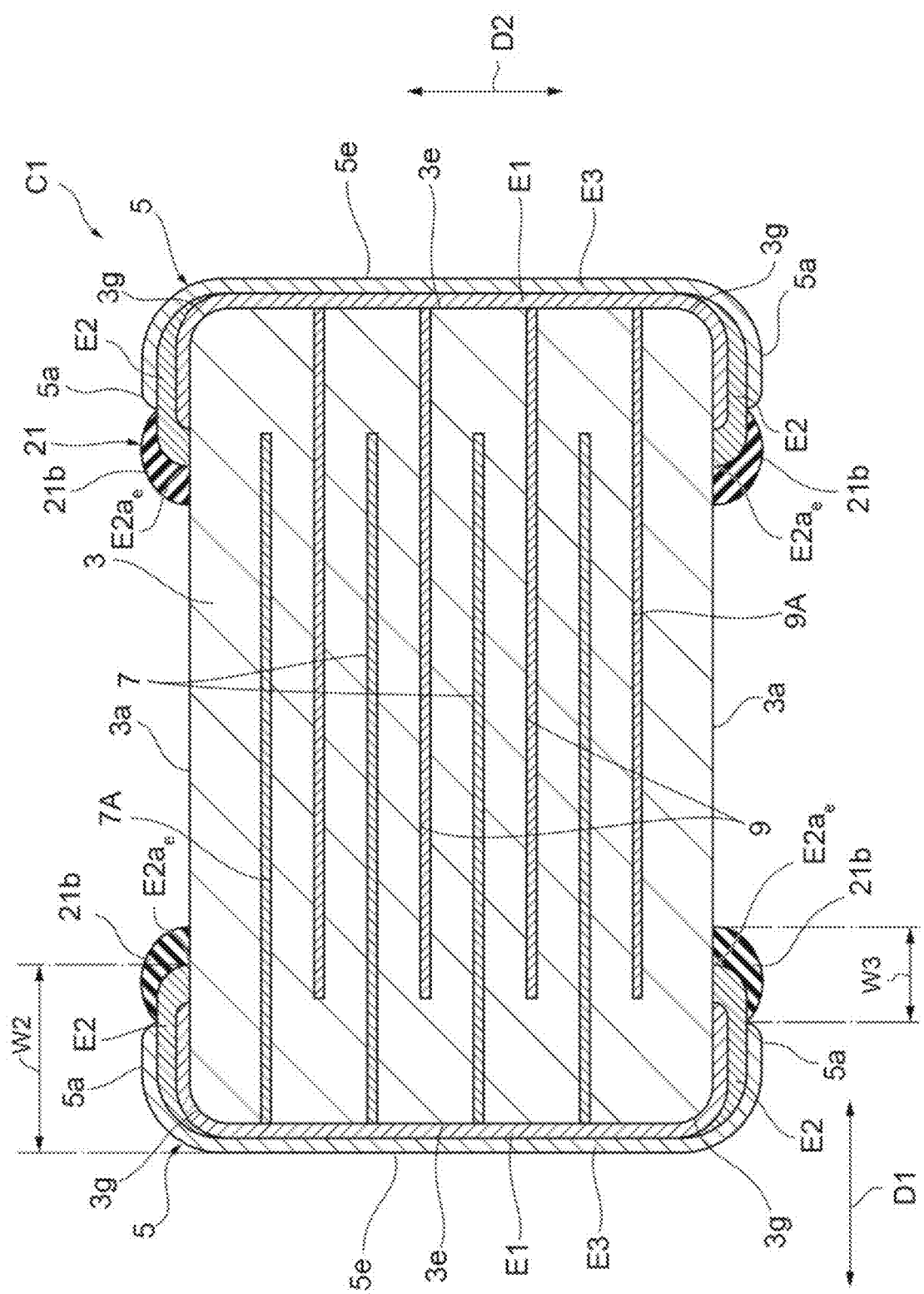
FIG. 2 is a view illustrating a cross-sectional configuration of the multilayer capacitor according to the first embodiment.
Figure 3:
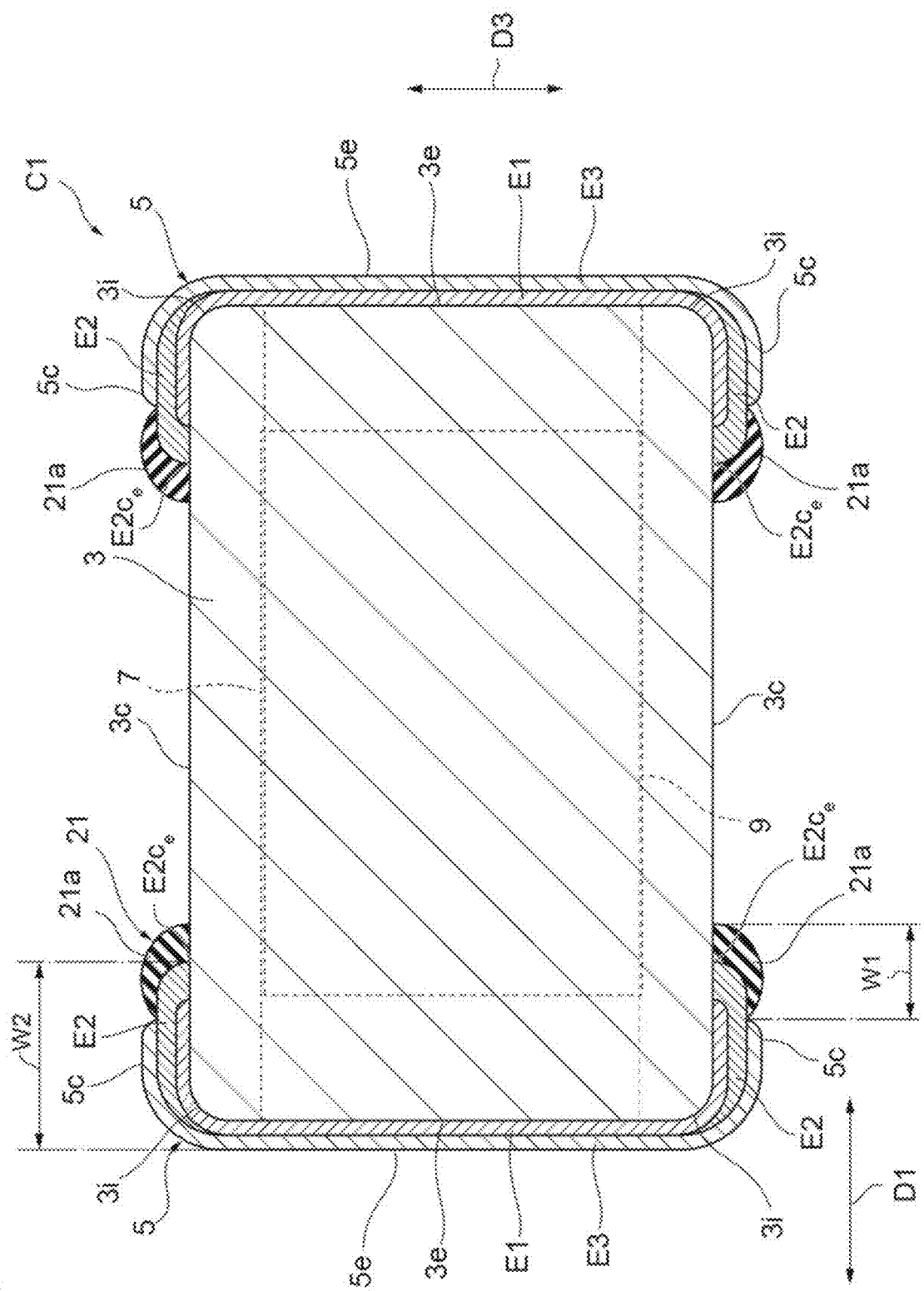
FIG. 3 is a view illustrating a cross-sectional configuration of the multilayer capacitor according to the first embodiment.

A configuration of a multilayer capacitor C1 according to a first embodiment will be described with reference to FIGS. 1 to 3. FIG. 1 is a perspective view of a multilayer capacitor according to the first embodiment. FIGS. 2 and 3 are views illustrating a cross-sectional configuration of the multilayer capacitor according to the first embodiment. In the present embodiment, an electronic component includes, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, and a rectangular parallelepiped shape in which the corners and ridges are rounded.

The element body 3 includes a pair of side surfaces 3a opposing each other, a pair of side surfaces 3c opposing each other, and a pair of end surfaces 3e opposing each other. The pair of side surfaces 3a, the pair of side surfaces 3c, and the pair of end surfaces 3e each have a rectangular shape. The pair of side surfaces 3a oppose each other in a second direction D2. The pair of side surfaces 3c oppose each other in a third direction D3. The pair of end surfaces 3e oppose each other in a first direction D1. The multilayer capacitor C1 is solder-mounted on an electronic device. The electronic device includes, for example, a circuit board or an electronic component. In the multilayer capacitor C1, one side surface 3a opposes the electronic device. The one side surface 3a is arranged to constitute a mounting surface. The one side surface 3a is the mounting surface. One side surface 3c of the pair of side surfaces 3c may be arranged to constitute a mounting surface. For example, in a case where the side surface 3a constitutes a first side surface, the side surface 3c constitutes a second side surface.

The second direction D2 is a direction orthogonal to each side surface 3a, and is orthogonal to the third direction D3. The first direction D1 is a direction parallel to each side surface 3a and each side surface 3c, and is orthogonal to the second direction D2 and the third direction D3. The third direction D3 is a direction orthogonal to each side surface 3c, and the first direction D1 is a direction orthogonal to each end surface 3e. In the present embodiment, a length of the element body 3 in the first direction D1 is larger than a length of the element body 3 in the second direction D2 and larger than a length of the element body 3 in the third direction D3. The first direction D1 is a longitudinal direction of the element body 3. The length of the element body 3 in the second direction D2 and the length of the element body 3 in the third direction D3 may be equal to each other. The length of the element body 3 in the second direction D2 and the length of the element body 3 in the third direction D3 may be different.

The length of the element body 3 in the second direction D2 is a height of the element body 3. The length of the element body 3 in the third direction D3 is a width of the element body 3. The length of the element body 3 in the first direction D1 is a length of the element body 3. In the present embodiment, the height of the element body 3 is 0.1 to 2.5 mm, the width of the element body 3 is 0.1 to 5.0 mm, and the length of the element body 3 is 0.2 to 5.7 mm. For example, the height of the element body 3 is 2.5 mm, the width of the element body 3 is 2.5 mm, and the length of the element body 3 is 3.2 mm.

The pair of side surfaces 3c extend in the second direction D2 to couple the pair of side surfaces 3a to each other. The pair of side surfaces 3c also extend in the first direction D1. The pair of end surfaces 3e extend in the second direction D2 to couple the pair of side surfaces 3a to each other. The pair of end surfaces 3e also extend in the third direction D3.

The element body 3 includes four ridge portions 3g, four ridge portions 3i, and four ridge portions 3j. The ridge portion 3g is located between the end surface 3e and the side surface 3a. The ridge portion 3i is located between the end surface 3e and the side surface 3c. The ridge portion 3j is located between the side surface 3a and the side surface 3c. In the present embodiment, the ridge portions 3g, 3i, and 3j are rounded to be curved. The element body 3 is subjected to what is called a round chamfering process. The end surface 3e and the side surface 3a are indirectly adjacent to each other with the ridge portion 3g interposed therebetween. The end surface 3e and the side surface 3c are indirectly adjacent to each other with the ridge portion 3i interposed therebetween. The side surface 3a and the side surface 3c are indirectly adjacent to each other with the ridge portion 3j interposed therebetween.

The element body 3 is configured through laminating a plurality of dielectric layers in the second direction D2. The element body 3 includes a plurality of laminated dielectric layers. In the element body 3, a lamination direction of the plurality of dielectric layers coincides with the second direction D2. Each dielectric layer includes, for example, a sintered element body of a ceramic green sheet containing a dielectric material. Examples of the dielectric material include dielectric ceramics. Examples of the dielectric ceramics include $BaTiO_3$-based, $Ba(Ti, Zr)O_3$-based, and $(Ba, Ca)TiO_3$-based dielectric ceramics. In the actual element body 3, each of the dielectric layers is integrated to such an extent that a boundary between the dielectric layers cannot be visually recognized.

As illustrated in FIGS. 2 and 3, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. In the present embodiment, the internal electrodes 7 and 9 are made of Ni.

The internal electrodes 7 and the internal electrodes 9 are disposed in different positions (layers) in the second direction D2. The internal electrodes 7 and the internal electrodes 9 are alternately disposed in the element body 3 to oppose each other in the second direction D2 with an interval therebetween. The internal electrodes 7 and the internal electrodes 9 have different polarities from each other. One end of each of the internal electrodes 7 and 9 is exposed to a corresponding end surface 3e of the pair of end surfaces 3e. Each of the internal electrodes 7 and 9 includes the one end exposed to the corresponding end surface 3e.

The plurality of internal electrodes 7 and the plurality of internal electrodes 9 are alternately disposed in the second direction D2. The plurality of internal electrodes 7 and the plurality of internal electrodes 9 are disposed in the element body 3 to be distributed in the second direction D2. Each of the plurality of internal electrodes 7 and the plurality of internal electrodes 9 is located in a plane approximately parallel to the side surface 3a. The internal electrode 7 and the internal electrode 9 oppose each other in the second direction D2. The direction (second direction D2) in which the internal electrode 7 and the internal electrode 9 oppose each other is orthogonal to a direction parallel to the side surface 3a (third direction D3 and first direction D1).

In the present embodiment, the plurality of internal electrodes 7 include one internal electrode 7A located outermost in the second direction D2. The internal electrode 7A is an outermost internal electrode.

In the present embodiment, the plurality of internal electrodes 9 include one internal electrode 9A located outermost in the second direction D2. The internal electrode 9A is an outermost internal electrode.

In FIG. 3, for the sake of explanation, the internal electrodes 7 and 9 (internal electrodes 7A and 9A) are intentionally illustrated so as to deviate from each other in the third direction D3.

As illustrated in FIG. 1, the external electrodes 5 are disposed at both ends of the element body 3 in the first direction D1. Each external electrode 5 is disposed on the corresponding end surface 3e side of the element body 3. In the present embodiment, each external electrode 5 is element on the pair of side surfaces 3a, the pair of side surfaces 3c, and the end surface 3e. The external electrode 5 includes a plurality of electrode portions 5a, 5c, and 5e as illustrated in FIGS. 2 and 3. The electrode portion 5a is disposed on the side surface 3a and on the ridge portion 3g. Each electrode portion 5c is disposed on the side surface 3c and on the ridge portion 3i. The electrode portion 5e is disposed on the end surface 3e. The external electrode 5 also includes an electrode portion disposed on the ridge portion 3j.

The external electrodes 5 are formed on the five surfaces of the pair of side surfaces 3a, the end surface 3e, and the pair of side surfaces 3c and the ridge portions 3g, 3i, and 3j. The electrode portions 5a, 5c, and 5e adjacent to each other are coupled and are electrically connected to each other. The electrode portion 5e covers all the one ends of the corresponding internal electrodes 7 and 9 of the plurality of internal electrodes 7 and 9. The electrode portion 5e is directly connected to the corresponding internal electrodes 7 and 9. The external electrode 5 is electrically connected to the corresponding internal electrodes 7 and 9. As illustrated in FIGS. 2 and 3, the external electrode 5 includes a first electrode layer E1, a second electrode layer E2, and a third electrode layer E3. The third electrode layer E3 is arranged to constitute the outermost layer of the external electrode 5. Each of the electrode portions 5a and 5c includes the first electrode layer E1, the second electrode layer E2, and the third electrode layer E3. Each electrode portion 5e includes the first electrode layer E1 and the third electrode layer E3.

The first electrode layer E1 of the electrode portion 5a is disposed on the side surface 3a and the ridge portion 3g. The first electrode layer E1 of the electrode portion 5a is formed to cover one part of the side surface 3a and the entire ridge portion 3g. The first electrode layer E1 of the electrode portion 5a is in contact with the above-described one part of the side surface 3a and the entire ridge portion 3g. In the electrode portion 5a, the first electrode layer E1 is in direct contact with the element body 3. The side surface 3a is covered with the first electrode layer E1 at the above-described one part, and is exposed from the first electrode layer E1 at the remaining part except the above-described one part. The above-described one part of the side surface 3a is a partial region near the end surface 3e, in the side surface 3a. The first electrode layer E1 of the electrode portion 5a is located on the side surface 3a. The first electrode layer E1 may not be formed on the side surface 3a. The first electrode layer E1 may not be disposed on the side surface 3a.

The second electrode layer E2 of the electrode portion 5a is disposed on the first electrode layer E1 and on the side surface 3a. In the electrode portion 5a, the second electrode layer E2 is formed to cover the first electrode layer E1 and a part of the side surface 3a. In the electrode portion 5a, the second electrode layer E2 is in direct contact with the first electrode layer E1 and the side surface 3a. The second electrode layer E2 of the electrode portion 5a is formed to cover the first electrode layer E1 of the electrode portion 5a. In the electrode portion 5a, the second electrode layer E2 indirectly covers the side surface 3a in such a manner that the first electrode layer E1 is located between the second electrode layer E2 and the side surface 3a. The second electrode layer E2 of the electrode portion 5a is located on the side surface 3a.

The third electrode layer E3 of the electrode portion 5a is disposed on the second electrode layer E2. In the electrode portion 5a, the third electrode layer E3 covers the second electrode layer E2. In the electrode portion 5a, the third electrode layer E3 is in contact with the second electrode layer E2. In the electrode portion 5a, the third electrode layer E3 is in direct contact with the second electrode layer E2. In the electrode portion 5a, the third electrode layer E3 is not in direct contact with the first electrode layer E1. The third electrode layer E3 of the electrode portion 5a is located on the side surface 3a.

The first electrode layer E1 of the electrode portion 5c is disposed on the side surface 3c and the ridge portion 3i. The first electrode layer E1 of the electrode portion 5c is formed to cover one part of the side surface 3c and the entire ridge portion 3i. The first electrode layer E1 of the electrode portion 5c is in contact with the above-described one part of the side surface 3c and the entire ridge portion 3i. In the electrode portion 5c, the first electrode layer E1 is in direct contact with the element body 3. The side surface 3c is covered with the first electrode layer E1 at the above-described one part, and is exposed from the first electrode layer E1 at the remaining part except the above-described one part. The above-described one part of the side surface 3c is a partial region near the end surface 3e, in the side surface 3c. The first electrode layer E1 of the electrode portion 5c is located on the side surface 3c. The first electrode layer E1 may not be formed on the side surface 3c. The first electrode layer E1 may not be disposed on the side surface 3c.

The second electrode layer E2 of the electrode portion 5c is disposed on the first electrode layer E1 and on the side surface 3c. In the electrode portion 5c, the second electrode layer E2 is formed to cover the first electrode layer E1 and a part of the side surface 3c. In the electrode portion 5c, the second electrode layer E2 is in direct contact with the first electrode layer E1 and the side surface 3c. The second electrode layer E2 of the electrode portion 5c is formed to cover the first electrode layer E1 of the electrode portion 5c. In the electrode portion 5c, the second electrode layer E2 indirectly covers the side surface 3c in such a manner that the first electrode layer E1 is located between the second electrode layer E2 and the side surface 3c. The second electrode layer E2 of the electrode portion 5c is located on the side surface 3c.

The third electrode layer E3 of the electrode portion 5c is disposed on the second electrode layer E2. In the electrode portion 5c, the third electrode layer E3 covers the second electrode layer E2. In the electrode portion 5c, the third electrode layer E3 is in contact with the second electrode layer E2. In the electrode portion 5c, the third electrode layer E3 is in direct contact with the second electrode layer E2. In the electrode portion 5c, the third electrode layer E3 is not in direct contact with the first electrode layer E1. The third electrode layer E3 of the electrode portion 5c is located on the side surface 3c.

The first electrode layer E1 of the electrode portion 5e is disposed on the end surface 3e. The first electrode layer E1 of the electrode portion 5e is formed to cover the entire end surface 3e. The first electrode layer E1 of the electrode portion 5e is in contact with the entire end surface 3e. In the electrode portion 5e, the first electrode layer E1 is in direct contact with the end surface 3e.

The third electrode layer E3 of the electrode portion 5e is disposed on the first electrode layer E1. In the electrode portion 5e, the third electrode layer E3 covers the entire first electrode layer E1. In the electrode portion 5e, the third electrode layer E3 is in contact with the entire first electrode layer E1. In the electrode portion 5e, the third electrode layer E3 is in direct contact with the first electrode layer E1. The third electrode layer E3 of the electrode portion 5e is located on the end surface 3e.

The first electrode layer E1 is formed from sintering electrically conductive paste applied onto the surface of the element body 3. The first electrode layer E1 is formed to cover the above-described one part of the side surface 3a, the above-described one part of the side surface 3c, the end surface 3e, and the ridge portions 3g, 3i, and 3j. The first electrode layer E1 is formed from sintering a metal component contained in the electrically conductive paste. The metal component contained in the electrically conductive paste includes, for example, a metal particle. The first electrode layer E1 includes a sintered metal layer. The first electrode layer E1 includes a sintered metal layer formed on the element body 3. In the present embodiment, the first electrode layer E1 includes a sintered metal layer made of Cu. The first electrode layer E1 may include a sintered metal layer made of Ni. The first electrode layer E1 contains a base metal. The electrically conductive paste contains, for example, particles formed of Cu or Ni, a glass component, an organic binder, and an organic solvent. The first electrode layer E1 included in each of the electrode portions 5a, 5c, and 5e is integrally formed.

The second electrode layer E2 is formed from curing electrically conductive resin applied onto the first electrode layer E1 and the element body 3. The second electrode layer E2 is formed on the first electrode layer E1 and the element body 3. The first electrode layer E1 is an underlying metal layer for forming the second electrode layer E2. The second electrode layer E2 is an electrically conductive resin layer that covers the first electrode layer E1. The conductive resin contains, for example, a resin, an electrically conductive material, and an organic solvent. The resin includes, for example, a thermosetting resin. The conductive material includes, for example, metal particles. Metal particles include, for example, silver particles or copper particles. In the present embodiment, the second electrode layer E2 includes a plurality of silver particles. The second electrode layer E2 includes a plurality of metal particles. The thermosetting resin is, for example, a phenol resin, an acrylic resin, a silicone resin, an epoxy resin, or a polyimide resin. The second electrode layer E2 is in contact with a part of the ridge portion 3j. The second electrode layer E2 included in each of the electrode portions 5a and 5c is integrally formed.

The third electrode layer E3 is formed on the second electrode layer E2 and on the first electrode layer E1 (a portion exposed from the second electrode layer E2) through a plating method. The third electrode layer E3 may have a multilayer structure. In this case, the third electrode layer E3 includes, for example, an Ni plating layer and a solder plating layer. The Ni plating layer is formed on the second electrode layer E2 and on the first electrode layer E1. The solder plating layer is formed on the Ni plating layer. The solder plating layer covers the Ni plating layer. The Ni plating layer has better solder leach resistance than the metal contained in the second electrode layer E2. The third electrode layer E3 may include an Sn plating layer, a Cu plating layer, or an Au plating layer instead of the Ni plating layer. The solder plating layer includes, for example, an Sn plating layer, an Sn—Ag alloy plating layer, an Sn—Bi alloy plating layer, or an Sn—Cu alloy plating layer. The third electrode layer E3 included in each of the electrode portions 5a, 5c, and 5e is integrally formed.

For example, in a case where the electrode portion 5c constitutes a first electrode portion, the electrode portion 5a constitutes a second electrode portion. In the present embodiment, the electrode portion 5e does not include the second electrode layer E2.

The multilayer capacitor C1 includes an insulating film 21 as illustrated in FIGS. 2 and 3. The insulating film 21 is disposed on the element body 3. The insulating film 21 includes a film portion 21a disposed on each side surface 3c and a film portion 21b disposed on each side surface 3a. In the present embodiment, the film portion 21a and the film portion 21b are integrally formed. The insulating film 21 is made of, for example, a resin having an electrical insulating property. The resin constituted the insulating film 21 includes, for example, an acrylic resin, a polyurethane resin, an epoxy resin, or a polyolefin resin. The insulating film 21 does not include a filler having electrical conductivity.

Figure 4:
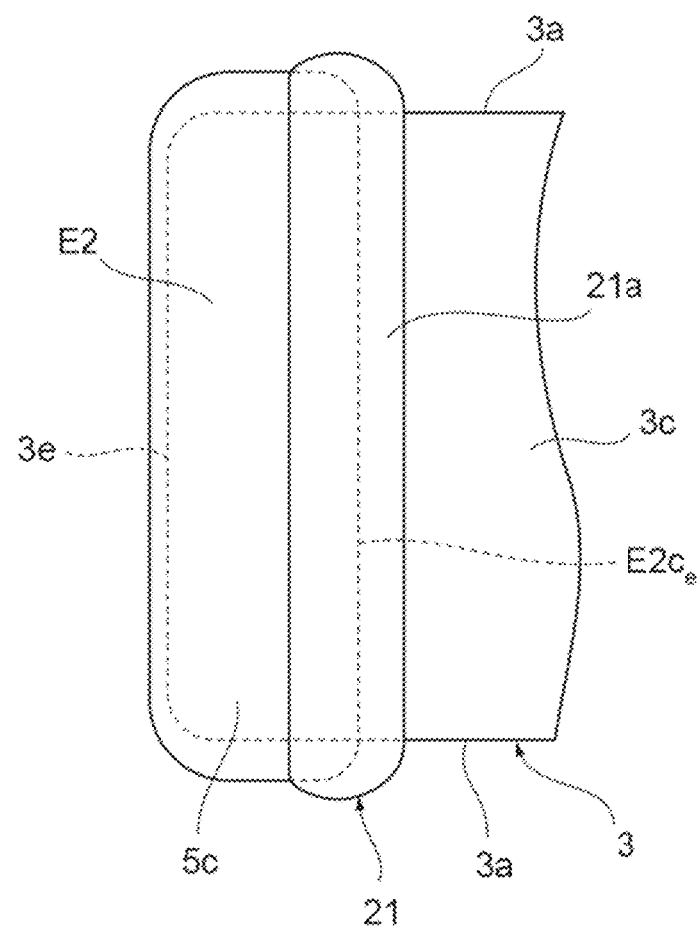
FIG. 4 is a view illustrating a second electrode layer and an insulating film.

As illustrated in FIG. 4, the film portion 21a is disposed on the side surface 3c to be along an edge E2c of the second electrode layer E2 included in the electrode portion 5c. FIG. 4 is a view illustrating a second electrode layer and an insulating film.

The film portion 21a is disposed on the side surface 3c to continuously cover the edge $E2c_e$ and a region exposed from the external electrode 5 on the side surface 3c. In the present embodiment, the film portion 21a is in direct contact with the second electrode layer E2 and the side surface 3c. The film portion 21a is disposed to directly cover the edge E2$c_e$ and the side surface 3c. On the side surface 3c, the film portion 21a extends along the edge E2$c_e$. In the electrode portion 5c, the film portion 21a covers a part of the second electrode layer E2 and the part of the second electrode layer E2 covered with the film portion 21a includes the edge E2$c_e$. The third electrode layer E3 of the electrode portion 5c is formed in a region of the second electrode layer E2 that is exposed from the film portion 21a.

As illustrated in FIG. 3, a width W1 of the film portion 21a is 5% or more of a width W2 of the external electrode 5. The width W1 is the length of the film portion 21a in the first direction D1. The width W2 of the external electrode 5 is the length of the external electrode 5 in the first direction D1.

Figure 5:
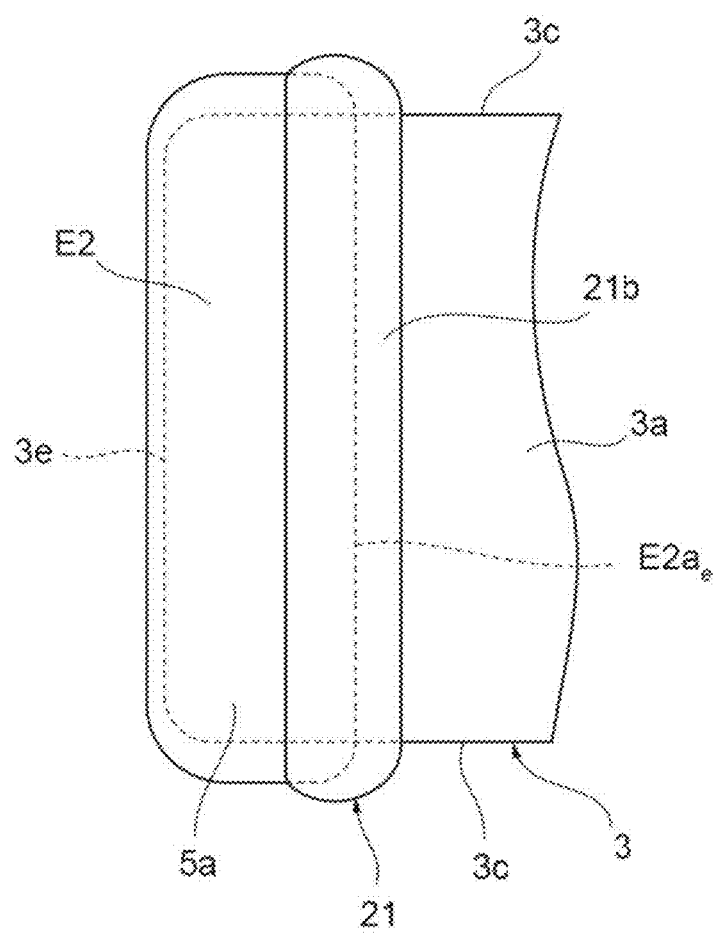
FIG. 5 is a view illustrating the second electrode layer and the insulating film.

As illustrated in FIG. 5, the film portion 21b is disposed on the side surface 3a to be along an edge E2$a_e$ of the second electrode layer E2 included in the electrode portion 5a. FIG. 5 is a view illustrating a second electrode layer and an insulating film.

The film portion 21b is disposed on the side surface 3a to continuously cover the edge E2$a_e$ and a region exposed from the external electrode 5 on the side surface 3a. In the present embodiment, the film portion 21b is in direct contact with the second electrode layer E2 and the side surface 3a. The film portion 21b is disposed to directly cover the edge E2$a_e$ and the side surface 3a. On the side surface 3a, the film portion 21b extends along the edge E2$a_e$. In the electrode portion 5a, the film portion 21b covers a part of the second electrode layer E2 and the part of the second electrode layer E2 covered with the film portion 21b includes the edge E2$a_e$. The third electrode layer E3 of the electrode portion 5a is formed in a region of the second electrode layer E2 that is exposed from the film portion 21b.

As illustrated in FIG. 2, a width W3 of the film portion 21b is 5% or more of the width W2. The width W3 is the length of the film portion 21b in the first direction D1. The width W3 may be the same as the width W1 or may be different from the width W1.

When the multilayer capacitor C1 is solder-mounted on an electronic device, an external force acting on the multilayer capacitor C1 from the electronic device may act on the element body 3 through the electrode portion 5c. The external force is transmitted to the electrode portion 5c from the solder fillet formed in solder-mounting. The electronic device includes, for example, a circuit board or an electronic component.

In the multilayer capacitor C1, the electrode portion 5c includes the second electrode layer E2. Therefore, the external force tends not to act on the element body 3 from the electrode portion 5c. Consequently, the multilayer capacitor C1 controls occurrence of cracks in the element body 3.

The external force acting on the multilayer capacitor C1 from the electronic device may act on the element body 3 through the electrode portion 5a.

In the multilayer capacitor C1, the electrode portion 5a includes the second electrode layer E2. Therefore, the external force tends not to act on the element body 3 from the electrode portion 5a. Consequently, the multilayer capacitor C1 further controls the occurrence of cracks in the element body 3.

In the multilayer capacitor C1, the film portion 21a covers the edge E2$c_e$ of the second electrode layer E2 included in the electrode portion 5c. Therefore, metal ions tend not to migrate from the second electrode layer E2 of the electrode portion 5c even in a case where the metal ions are generated in the second electrode layer E2 of the electrode portion 5c due to an electric field generated between the internal electrodes 7 and the second electrode layer E2 of the electrode portion 5c not electrically connected to the internal electrodes 7 or an electric field generated between the internal electrodes 9 and the second electrode layer E2 of the electrode portion 5c not electrically connected to the internal electrodes 9. The film portion 21a regulates migration of the metal ions. Consequently, the multilayer capacitor C1 controls occurrence of the migration.

In the multilayer capacitor C1, the film portion 21b covers the edge E2$a_e$ of the second electrode layer E2 included in the electrode portion 5a. Therefore, metal ions tend not to migrate from the second electrode layer E2 of the electrode portion 5a even in a case where the metal ions are generated in the second electrode layer E2 of the electrode portion 5a due to an electric field generated between the internal electrode 7A and the second electrode layer E2 of the electrode portion 5a not electrically connected to the internal electrode 7A or an electric field generated between the internal electrode 9A and the second electrode layer E2 of the electrode portion 5a not electrically connected to the internal electrode 9A. The film portion 21b regulates migration of the metal ions. Consequently, the multilayer capacitor C1 further controls the occurrence of the migration.

The second electrode layer E2 includes the plurality of silver particles. Silver particles tend to cause migration as compared with, for example, copper particles.

The multilayer capacitor C1 reliably controls the occurrence of the migration even when the second electrode layer E2 includes the plurality of silver particles.

Figure 6:
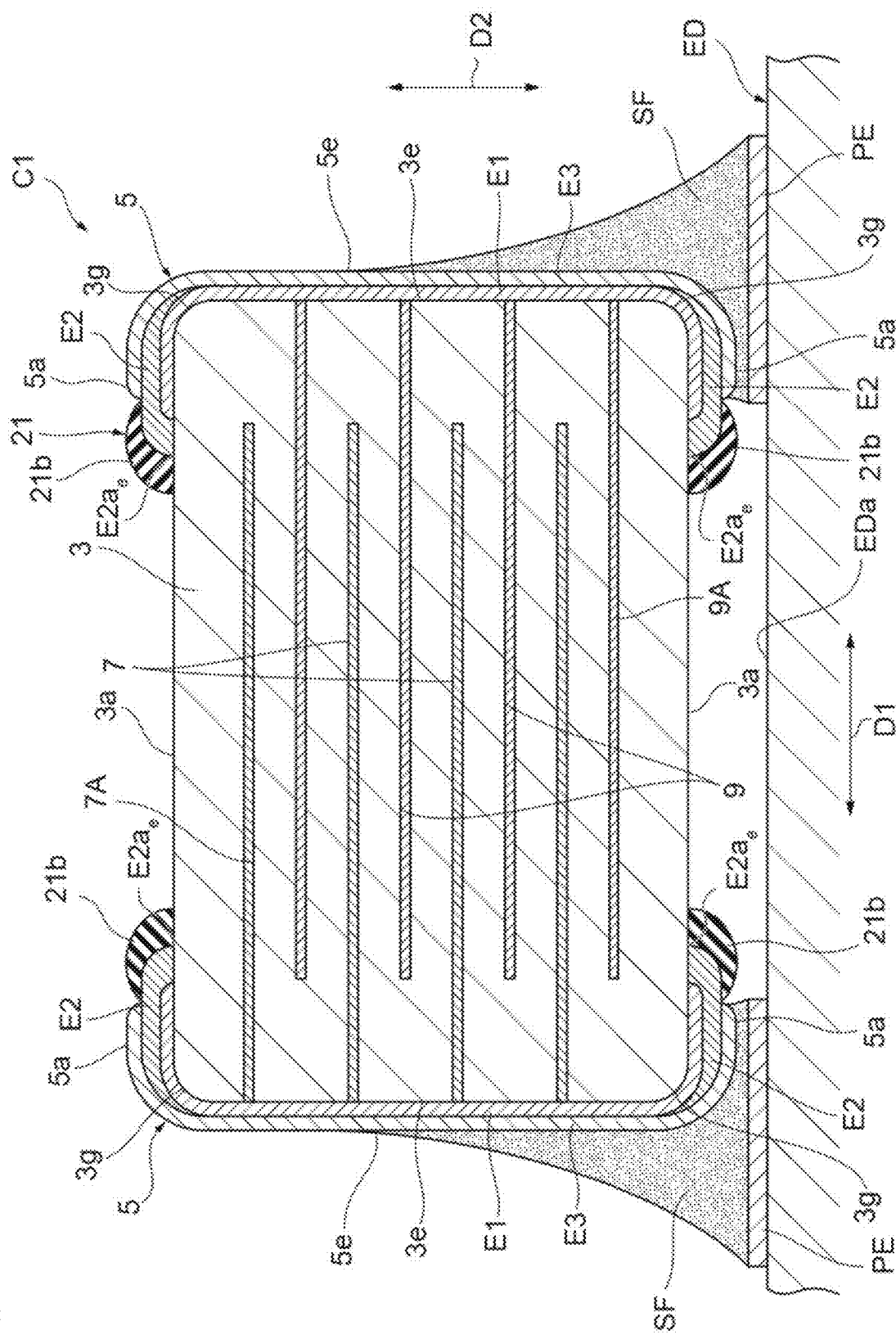
FIG. 6 is a view illustrating a mounting structure of the multilayer capacitor according to the first embodiment.

Next, a mounting structure of the multilayer capacitor C1 will be described with reference to FIG. 6. FIG. 6 is a view illustrating the mounting structure of a multilayer capacitor according to the present embodiment.

As illustrated in FIG. 6, an electronic component device includes the multilayer capacitor C1 and an electronic device ED. The electronic device ED includes, for example, a circuit board or an electronic component. The multilayer capacitor C1 is solder-mounted on the electronic device ED. The electronic device ED includes a principal surface EDa and two pad electrodes PE. Each pad electrode PE is disposed on the principal surface EDa. The two pad electrodes PE are separated from each other. The multilayer capacitor C1 is disposed on the electronic device ED in such a manner that the side surface 3a arranged to constitute the mounting surface and the principal surface EDa oppose each other. Each of the internal electrodes 7 and 9 is located in a plane approximately parallel to the principal surface EDa. When the side surface 3c is arranged to constitute the mounting surface, each of the internal electrodes 7 and 9 is located in a plane approximately orthogonal to the principal surface EDa.

In solder-mounting the multilayer capacitor C1, the molten solder wets the external electrode 5 (third electrode layer E3). Solidification of the wet solder causes a solder fillet SF to be formed on the external electrode 5. The external electrodes 5 and the pad electrodes PE corresponding to each other are connected to each other through the solder fillet SF.

Figure 7:
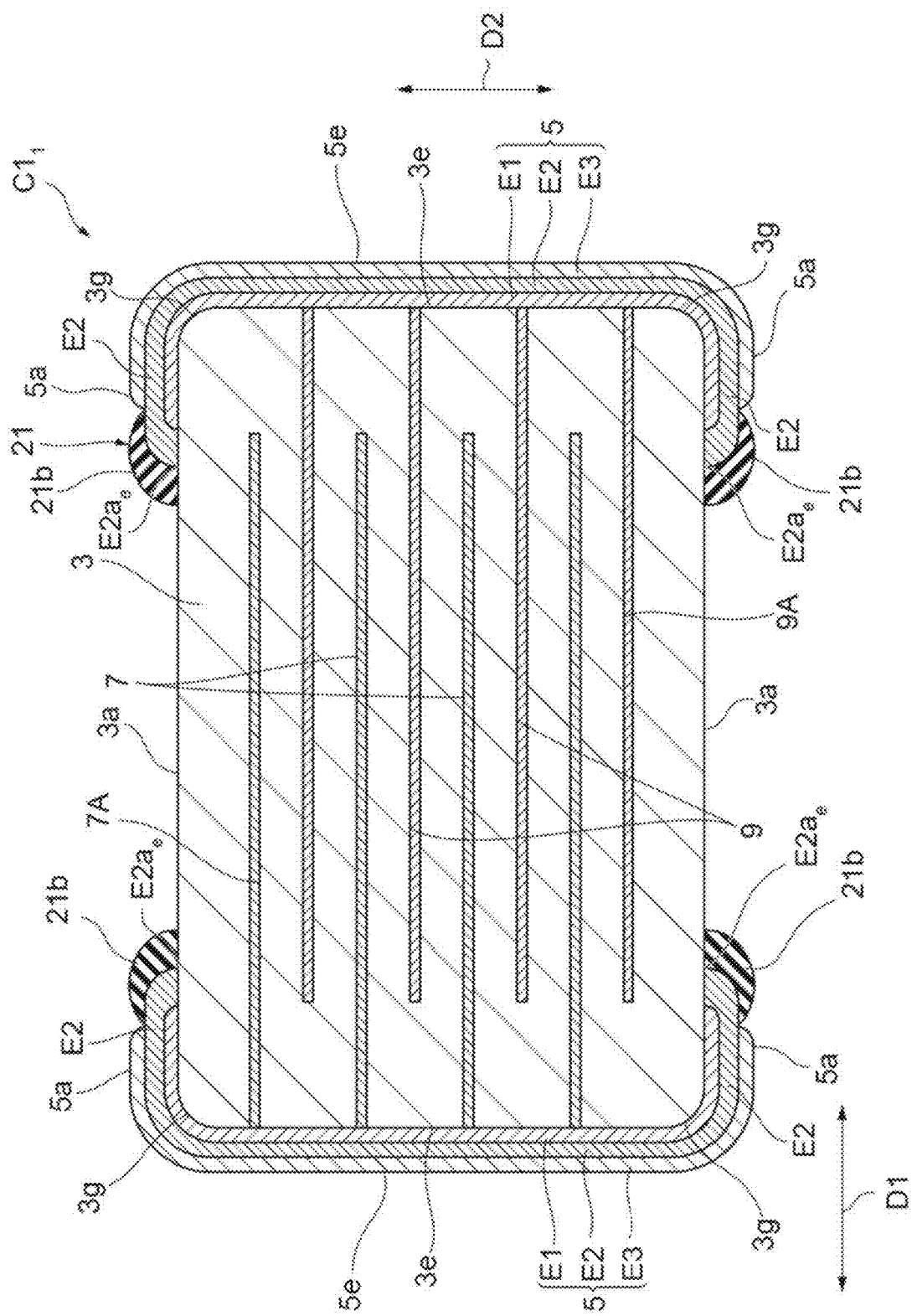
FIG. 7 is a view illustrating a cross-sectional configuration of a multilayer capacitor according to a modification of the first embodiment.

Next, a configuration of a multilayer capacitor $C1_1$ according to a modification of the first embodiment will be described with reference to FIG. 7. FIG. 7 is a view illustrating a cross-sectional configuration of a multilayer capacitor according to the modification of the first embodiment. The multilayer capacitor $C1_1$ according to this modification is generally similar to or the same as the multilayer capacitor C1 described above. However, this modification is different from the above-described first embodiment in the configuration of the electrode portion 5e. Hereinafter, differences between the above-described first embodiment and this modification will be mainly described.

Each electrode portion 5e includes a first electrode layer E1, a second electrode layer E2, and a third electrode layer E3.

The second electrode layer E2 of the electrode portion 5e is disposed on the first electrode layer E1. In the electrode portion 5e, the second electrode layer E2 is formed to cover the entire first electrode layer E1. In the electrode portion 5e, the second electrode layer E2 is in direct contact with the first electrode layer E1. In the electrode portion 5e, the second electrode layer E2 indirectly covers the end surface 3e in such a manner that the first electrode layer E1 is located between the second electrode layer E2 and the end surface 3e. The second electrode layer E2 of the electrode portion 5e is located on the end surface 3e.

The third electrode layer E3 of the electrode portion 5e is disposed on the second electrode layer E2. In the electrode portion 5e, the third electrode layer E3 covers the entire second electrode layer E2. In the electrode portion 5e, the third electrode layer E3 is in contact with the entire second electrode layer E2. In the electrode portion 5e, the third electrode layer E3 is in direct contact with the second electrode layer E2. In the electrode portion 5e, the third electrode layer E3 is not in direct contact with the first electrode layer E1. The second electrode layer E2 included in each of the electrode portions 5a, 5c, and 5e is integrally formed.

The configuration in which the electrode portion 5e includes the second electrode layer E2 reduces stress acting on the solder fillet formed on the electrode portion 5e. Therefore, the multilayer capacitor $C1_1$ controls occurrence of solder cracks.

Figure 8:
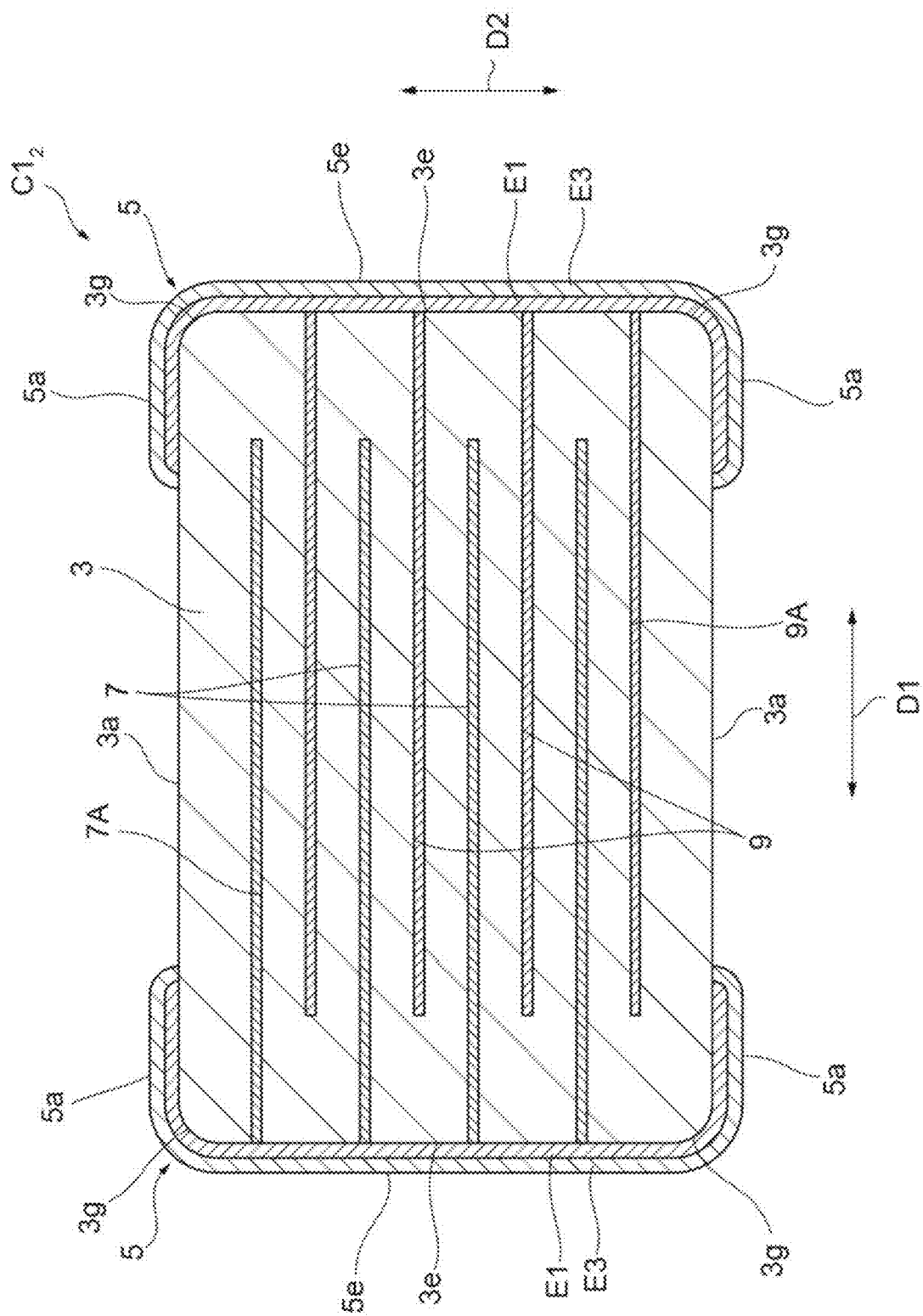
FIG. 8 is a view illustrating a cross-sectional configuration of a multilayer capacitor according to a modification of the first embodiment.

Next, a configuration of a multilayer capacitor $C1_2$ according to a modification of the first embodiment will be described with reference to FIG. 8. FIG. 8 is a view illustrating a cross-sectional configuration of a multilayer capacitor according to the modification of the first embodiment. The multilayer capacitor $C1_2$ according to this modification is generally similar to or the same as the multilayer capacitor C1 described above. However, this modification is different from the above-described first embodiment in the configuration of the electrode portion 5a and the insulating film 21. Hereinafter, differences between the above-described first embodiment and this modification will be mainly described.

As illustrated in FIG. 8, the electrode portion 5a may not include the second electrode layer E2.

The third electrode layer E3 of the electrode portion 5a is disposed on the first electrode layer E1. In the electrode portion 5a, the third electrode layer E3 covers the entire first electrode layer E1. In the electrode portion 5a, the third electrode layer E3 is in contact with the entire first electrode layer E1. In the electrode portion 5a, the third electrode layer E3 is in direct contact with the first electrode layer E1. The third electrode layer E3 of the electrode portion 5a is located on the side surface 3a.

In the configuration in which the electrode portion 5a does not include the second electrode layer E2, the second electrode layer E2 and the internal electrode 7 that are not electrically connected to each other do not oppose each other in the second direction D2, and the second electrode layer E2 and the internal electrode 9 that are not electrically connected to each other do not oppose each other in the second direction D2. Therefore, the insulating film 21 may not include the film portion 21b. Even when the insulating film 21 does not include the film portion 21b, the multilayer capacitor $C1_2$ further controls the occurrence of the migration.

In the configuration in which the electrode portion 5a does not include the second electrode layer E2, the insulating film 21 may not include the film portion 21b as illustrated in FIG. 8. Even in the configuration in which the insulating film 21 does not include the film portion 21b, the insulating film 21 includes the film portion 21a as in the multilayer capacitor C1 illustrated in FIG. 3.

Figure 9:
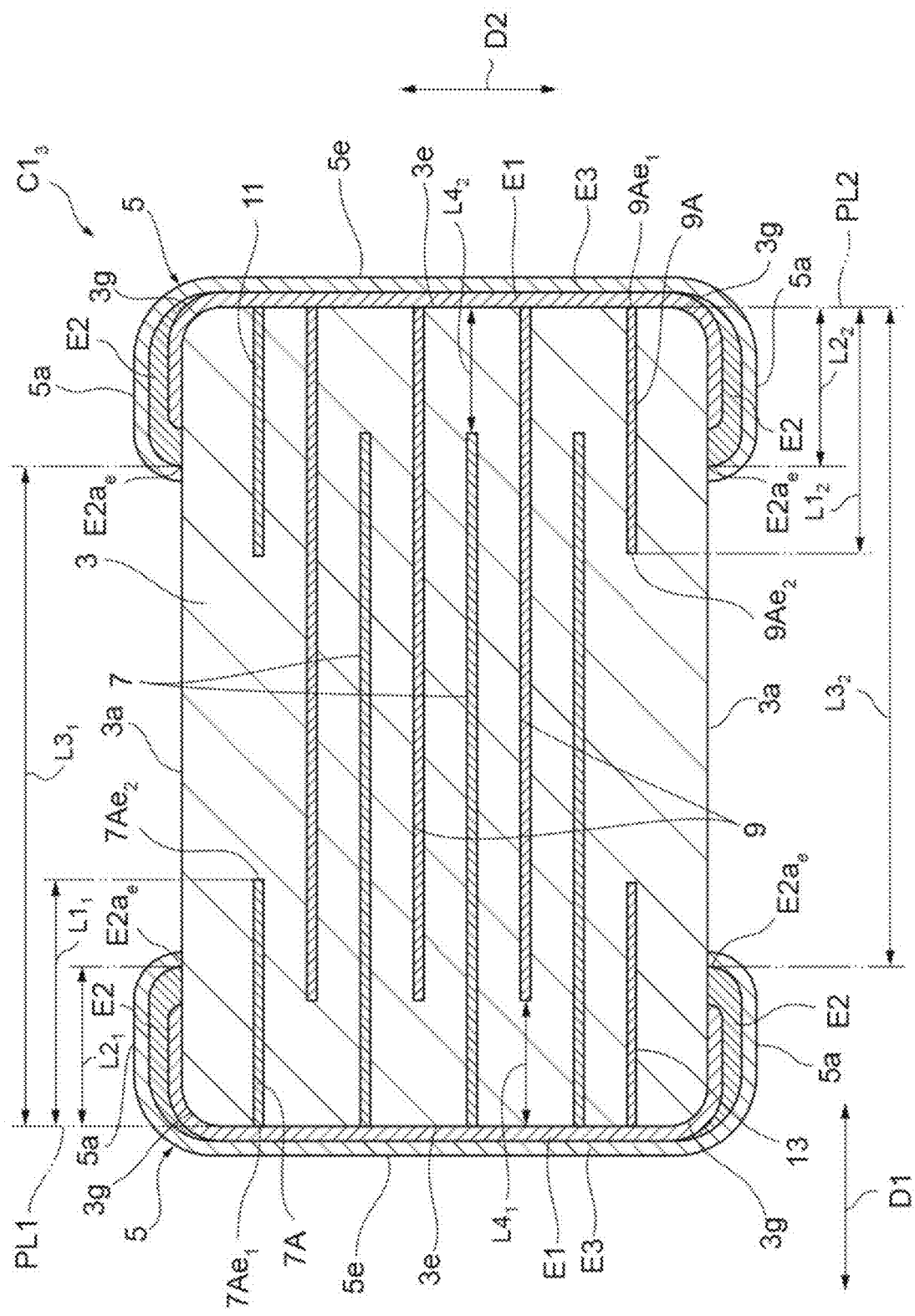
FIG. 9 is a view illustrating a cross-sectional configuration of a multilayer capacitor according to a modification of the first embodiment.
Figure 10:
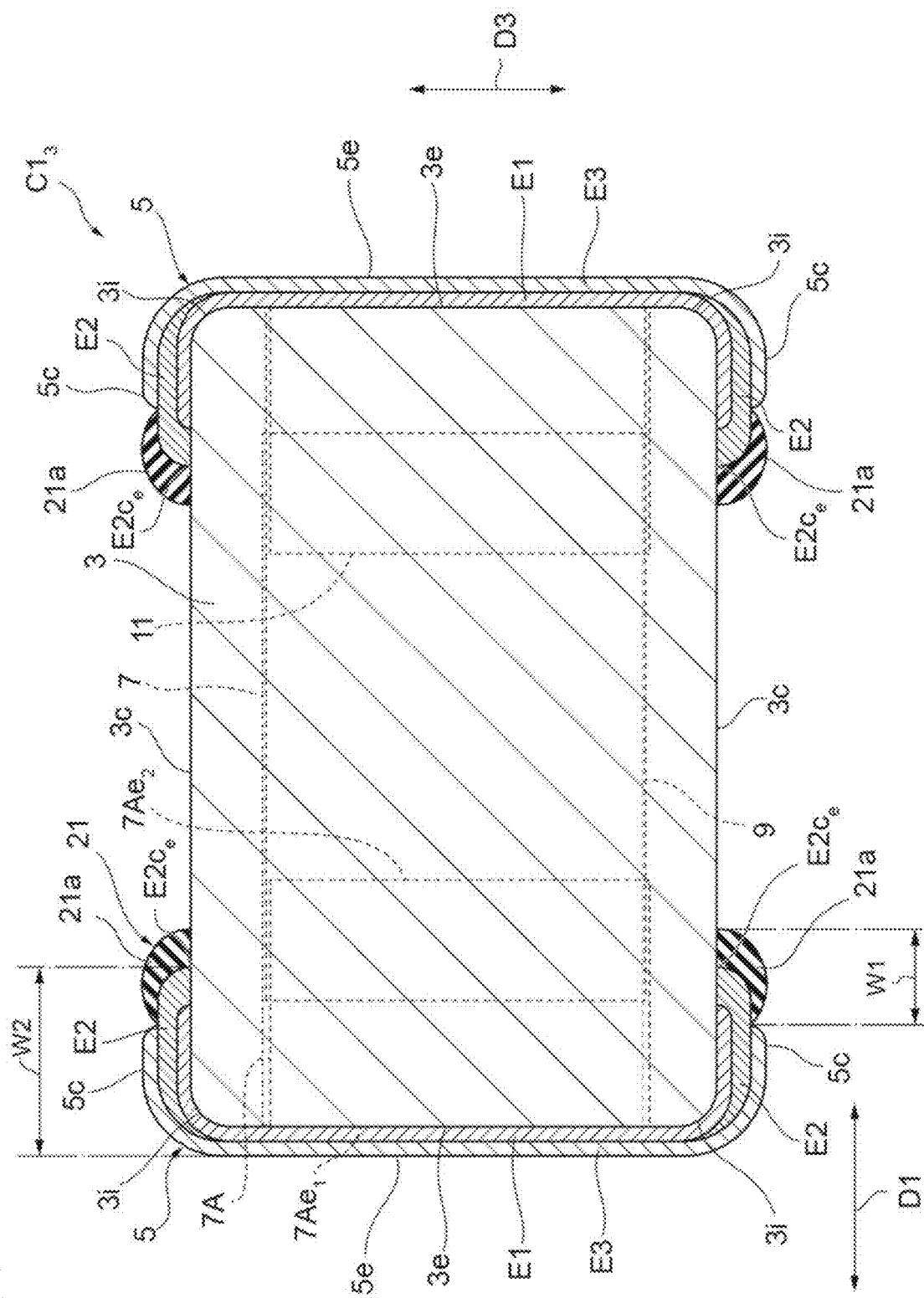
FIG. 10 is a view illustrating a cross-sectional configuration of the multilayer capacitor according to the modification of the first embodiment.
Figure 11:
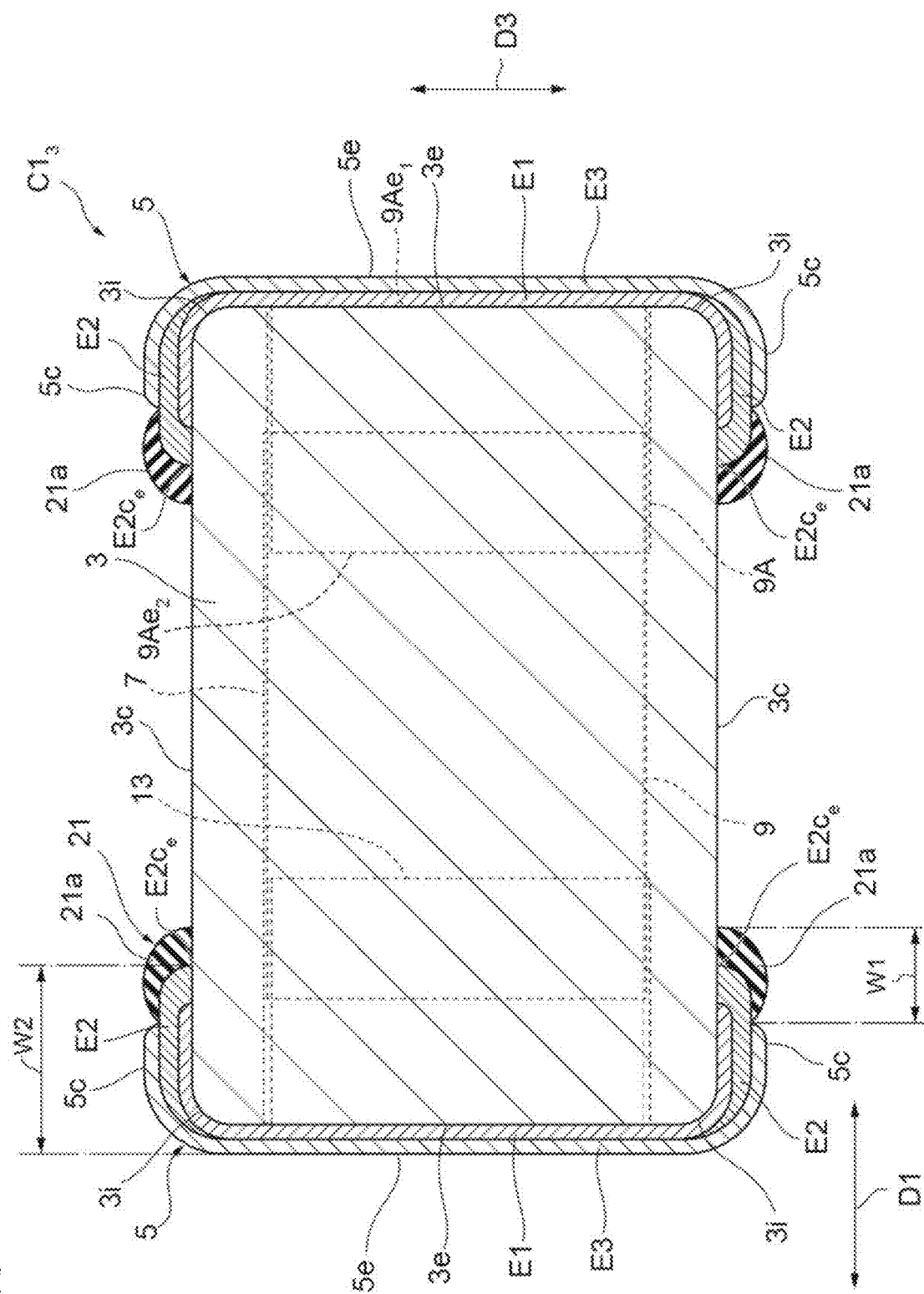
FIG. 11 is a view illustrating a cross-sectional configuration of the multilayer capacitor according to the modification of the first embodiment.

Next, a configuration of a multilayer capacitor $C1_3$ according to a modification of the first embodiment will be described with reference to FIGS. 9 to 11. FIGS. 9, 10, and 11 are views illustrating a cross-sectional configuration of a multilayer capacitor according to the modification of the first embodiment. The multilayer capacitor $C1_3$ according to this modification is generally similar to or the same as the multilayer capacitor C1 described above. However, this modification is different from the above-described first embodiment in the configuration of the internal electrodes 7A and 9A and the insulating film 21. Hereinafter, differences between the above-described first embodiment and this modification will be mainly described.

The internal electrode 7A includes a pair of ends $7Ae_1$ and $7Ae_2$ opposing each other in the first direction D1, as illustrated in FIGS. 9 and 10. The end $7Ae_1$ is exposed to the end surface 3e. The end $7Ae_2$ is located within the element body 3. The internal electrode 9A includes a pair of ends $9Ae_1$ and $9Ae_2$ opposing each other in the first direction D1, as illustrated in FIGS. 9 and 11. The end $9Ae_1$ is exposed to the end surface 3e. The end $9Ae_2$ is located within the element body 3. For example, when each of the ends $7Ae_1$ and $9Ae_1$ constitutes a first end, each of the ends $7Ae_2$ and $9Ae_1$ constitutes a second end.

The second electrode layer E2 of the electrode portion 5a is located on the side surface 3a. Each second electrode layer E2 located on the same side surface 3a includes an edge $E2a_e$. On the same side surface 3a, the edge $E2a_e$ of one second electrode layer E2 opposes the edge $E2a_e$ of the other second electrode layer E2.

As illustrated in FIG. 9, a length $L1_1$ is larger than a length $L2_1$. The length $L1_1$ is the length of the internal electrode 7A in the first direction D1 from a reference plane PL1. The length $L2_1$ is a length in the first direction D1 from the reference plane PL1 to the edge $E2a_e$ of the second electrode layer E2 electrically connected to the internal electrode 7A. Therefore, when the internal electrode 7A and the second electrode layer E2 electrically connected to the internal electrode 7A are viewed from the second direction D2, the end $7Ae_2$ is exposed from the second electrode layer E2 electrically connected to the internal electrode 7A.

The length $L1_1$ is smaller than a length $L3_1$. The length $L3_1$ is a length in the first direction D1 from the reference plane PL1 to the edge $E2a_e$ of the second electrode layer E2 not electrically connected the internal electrode 7A. Therefore, when the internal electrode 7A and the second electrode layer E2 not electrically connected the internal electrode 7A are viewed from the second direction D2, the internal electrode 7A and the second electrode layer E2 not electrically connected the internal electrode 7A does not overlap each other.

The reference plane PL1 includes the end surface 3e to which the end $7Ae_1$ of the internal electrode 7A is exposed. For example, when the length $L1_1$ constitutes a first length, the length $L2_1$ constitutes a second length and the length $L3_1$ constitutes a third length.

A length $L1_2$ is larger than a length $L2_2$. The length $L1_2$ is the length of the internal electrode 9A in the first direction D1 from a reference plane PL2. The length $L2_2$ is a length in the first direction D1 from the reference plane PL2 to the edge $E2a_e$ of the second electrode layer E2 electrically connected to the internal electrode 9A. Therefore, when the internal electrode 9A and the second electrode layer E2 electrically connected to the internal electrode 9A are viewed from the second direction D2, the end $9Ae_2$ is exposed from the second electrode layer E2 electrically connected to the internal electrode 9A.

The length $L1_2$ is smaller than a length $L3_2$. The length $L3_2$ is a length in the first direction D1 from the reference plane PL2 to the edge $E2a_e$ of the second electrode layer E2 not electrically connected to the internal electrode 9A. Therefore, when the internal electrode 9A and the second electrode layer E2 not electrically connected to the internal electrode 9A are viewed from the second direction D2, the internal electrode 9A and the second electrode layer E2 not electrically connected to the internal electrode 9A does not overlap each other.

The reference plane PL2 includes the end surface 3e to which the end $9Ae_1$ of the internal electrode 9A is exposed. For example, when the length $L1_2$ constitutes a first length, the length $L2_2$ constitutes a second length and the length $L3_2$ constitutes a third length.

A length $L4_1$ is smaller than the length $L2_1$. The length $L4_1$ is a length in the first direction D1 from the reference plane PL1 to the other end of the internal electrode 9. Therefore, when the internal electrode 9 not electrically connected to the internal electrode 7A and the second electrode layer E2 to which the internal electrode 7A is electrically connected are viewed from the second direction D2, the internal electrode 9 and the second electrode layer E2 to which the internal electrode 7A is electrically connected overlap each other.

A length $L4_2$ is smaller than the length $L2_2$. The length $L4_2$ is a length in the first direction D1 from the reference plane PL2 to the other end of the internal electrode 7. Therefore, when the internal electrode 7 not electrically connected to the internal electrode 9A and the second electrode layer E2 electrically connected to the internal electrode 9A are viewed from the second direction D2, the internal electrode 7 and the second electrode layer E2 electrically connected to the internal electrode 9A overlap each other.

The length $L1_1$ and the length $L1_2$ may be equal or different. The length $L2_1$ and the length $L2_2$ may be equal or different. The length $L3_1$ and the length $L3_2$ may be equal or different. The length $L4_1$ and the length $L4_2$ may be equal or different.

The multilayer capacitor $C1_3$ includes a plurality of conductors 11 and 13. The multilayer capacitor $C1_3$ includes two conductors 11 and 13. In FIGS. 10 and 11, for the sake of explanation, the internal electrodes 7 and 9 (internal electrodes 7A and 9A) and the conductors 11 and 13 are intentionally illustrated so as to deviate from each other in the third direction D3. Each of conductors 11 and 13 constitutes an electrical conductor.

The conductor 11 is located in the same layer as the internal electrode 7A and is separated from the internal electrode 7A. The conductor 11 includes one end exposed to the corresponding end surface 3e. The one end of the conductor 11 is exposed to the end surface 3e to which one end of the internal electrode 9 is exposed. The one end of the conductor 11 is completely covered with the corresponding electrode portion 5e. The conductor 11 is directly connected to the corresponding electrode portion 5e. The conductor 11 is electrically connected to the corresponding external electrode 5. In the multilayer capacitor $C1_3$, the conductor 11 is electrically connected to the external electrode 5 (electrode portion 5e) electrically connected to the internal electrode 9. The conductor 11 is electrically connected to the external electrode 5 not electrically connected to the internal electrode 7.

The conductor 13 is located in the same layer as the internal electrode 9A and is separated from the internal electrode 9A. The conductor 13 includes one end exposed to the corresponding end surface 3e. The one end of the conductor 13 is exposed to the end surface 3e to which one end of the internal electrode 7 is exposed. The one end of the conductor 13 is completely covered with the corresponding electrode portion 5e. The conductor 13 is directly connected to the corresponding electrode portion 5e. The conductor 13 is electrically connected to the corresponding external electrode 5. In the multilayer capacitor $C1_3$, the conductor 13 is electrically connected to the external electrode 5 (electrode portion 5e) electrically connected to the internal electrode 7. The conductor 13 is electrically connected to the external electrode 5 not electrically connected to the internal electrode 9.

The conductors 11 and 13 constitute dummy conductors that tend not to contribute to generation of capacitance.

In the multilayer capacitor $C1_3$, the lengths $L1_1$ and $L1_2$ are larger than the lengths $L2_1$ and $L2_2$. Therefore, the internal electrode 9 adjacent to the internal electrode 7A in the second direction D2 and the second electrode layer E2 included in the electrode portion 5a adjacent to the internal electrode 7A in the second direction D2 are not electrically connected to each other, but tend not to oppose each other in the second direction D2. The internal electrode 7 adjacent to the internal electrode 9A in the second direction D2 and the second electrode layer E2 included in the electrode portion 5a adjacent to the internal electrode 9A in the second direction D2 are not electrically connected to each other, but tend not to oppose each other in the second direction D2. An electric field tends not to be generated between the second electrode layer E2 and the internal electrode 7 that are not electrically connected to each other, and between the second electrode layer E2 and the internal electrode 9 that are not electrically connected to each other.

The lengths $L1_1$ and $L1_2$ are smaller than the lengths $L3_1$ and $L3_2$. Therefore, the internal electrode 7A tends not to oppose the second electrode layer E2 included in the electrode portion 5a not electrically connected to the internal electrode 7A, in the second direction D2, and the internal electrode 9A tends not to oppose the second electrode layer E2 included in the electrode portion 5a not electrically connected to the internal electrode 9A, in the second direction D2. An electric field tends not to be generated between the second electrode layer E2 and the internal electrode 7A that are not electrically connected to each other, and between the second electrode layer E2 and the internal electrode 9A that are not electrically connected to each other.

Consequently, the multilayer capacitor $C1_3$ further controls the occurrence of the migration. Therefore, the insulating film 21 may not include the film portion 21b.

In the multilayer capacitor $C1_3$, the conductor 11 is electrically connected to the external electrode 5 not electrically connected to the internal electrode 7A. The conductor 13 is electrically connected to the external electrode 5 not electrically connected to the internal electrode 9A.

In the configuration in which the conductor 11 is located in the same layer as the internal electrode 7A and the conductor 13 is located in the same layer as the internal electrode 9A, structural defects tend not to occur in the element body 3.

Figure 12:
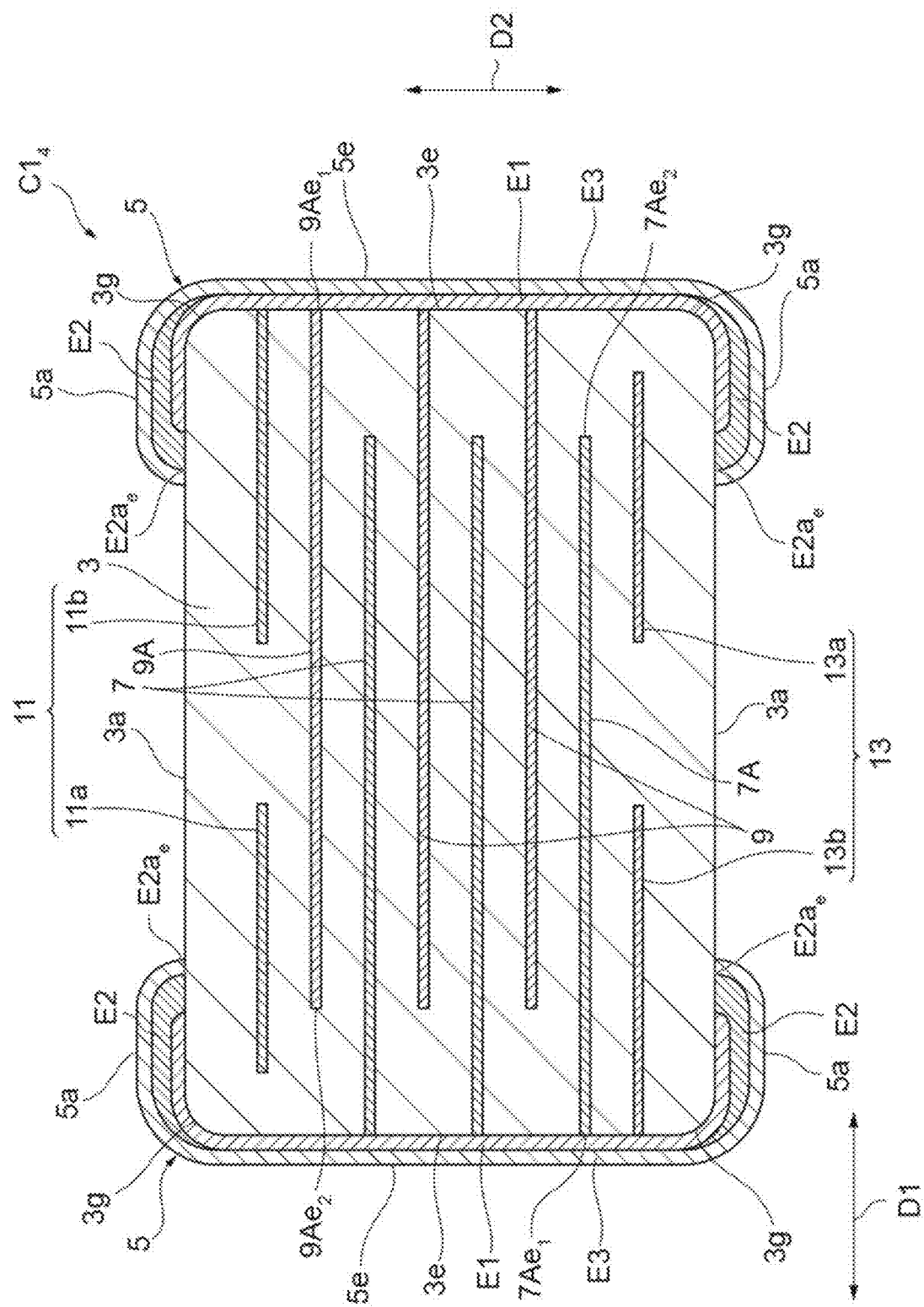
FIG. 12 is a view illustrating a cross-sectional configuration of a multilayer capacitor according to a modification of the first embodiment.
Figure 13:
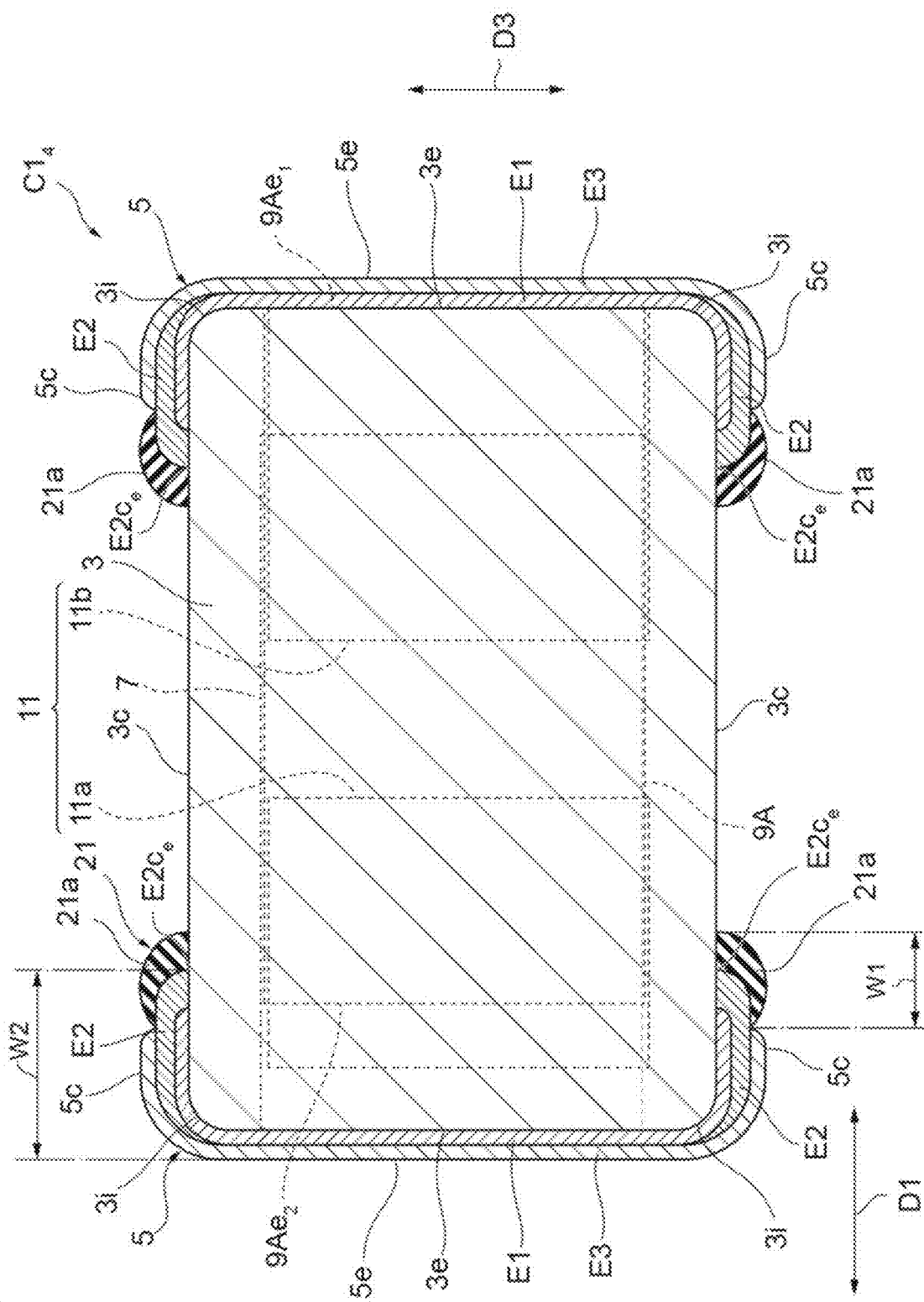
FIG. 13 is a view illustrating a cross-sectional configuration of the multilayer capacitor according to the modification of the first embodiment.
Figure 14:
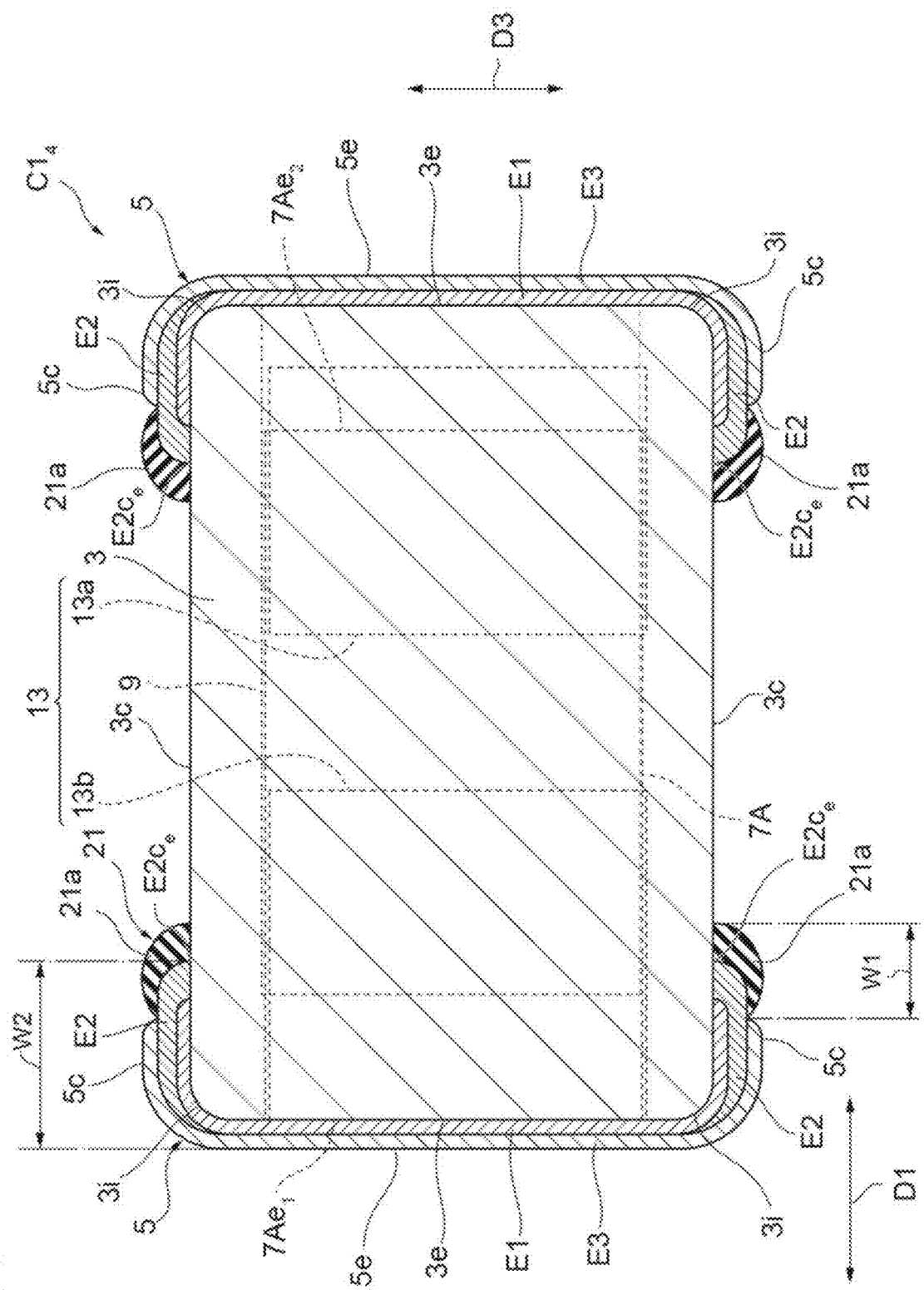
FIG. 14 is a view illustrating a cross-sectional configuration of the multilayer capacitor according to the modification of the first embodiment.

Next, a configuration of a multilayer capacitor $C1_4$ according to a modification of the first embodiment will be described with reference to FIGS. 12 to 14. FIGS. 12, 13, and 14 are views illustrating a cross-sectional configuration of a multilayer capacitor according to the modification of the first embodiment. The multilayer capacitor $C1_4$ according to this modification is generally similar to or the same as the multilayer capacitor $C1_3$ illustrated in FIGS. 9 to 11. However, this modification is different from the multilayer capacitor $C1_3$ in the configuration of the conductors 11 and 13. Hereinafter, differences between the multilayer capacitor $C1_3$ and this modification will be mainly described.

The multilayer capacitor $C1_4$ includes a pair of conductors 11 and 13. In FIGS. 13 and 14, for the sake of explanation, the internal electrodes 7A and 9A and the conductors 11 and 13 are intentionally illustrated so as to deviate from each other in the third direction D3. Even in the multilayer capacitor $C1_4$, the conductors 11 and 13 constitute dummy conductors that tend not to contribute to generation of capacitance. Each of conductors 11 and 13 constitutes an electrical conductor.

The conductor 11 is adjacent to one side surface 3a in the second direction D2. The conductor 11 is adjacent to the internal electrode 9A in the second direction D2. The conductor 11 is located between the one side surface 3a and the internal electrode 9A. The conductor 11 includes a portion 11a and a portion 11b.

The portion 11a opposes the second electrode layer E2 in the second direction D2. The second electrode layer E2 opposing the portion 11a is not electrically connected to the internal electrode 9A and is disposed on the one side surface 3a. Therefore, the conductor 11 opposes the second electrode layer E2 not electrically connected to the internal electrode 9A, in the second direction D2.

The portion 11b opposes the second electrode layer E2 in the second direction D2. The second electrode layer E2 opposing the portion 11b is electrically connected to the internal electrode 9A and is disposed on the one side surface 3a.

For example, when the portion 11a constitutes a first portion, the portion 11b constitutes a second portion.

The portion 11a is separated from the portion 11b in the first direction D1 and is not electrically connected to any second electrode layer E2. The portion 11a includes no end exposed to the surface of the element body 3.

The portion 11b is electrically connected to the second electrode layer E2 opposing the portion 11b in the second direction D2. The portion 11b includes an end exposed to the end surface 3e to which the internal electrode 9A is exposed. The portion 11b is directly connected to the external electrode 5 (electrode portion 5e) electrically connected to the internal electrode 9A, at the end exposed to the end surface 3e. The portion 11b is electrically connected to the external electrode 5 to which the internal electrode 9A is electrically connected.

The conductor 13 is adjacent to the other side surface 3a in the second direction D2. The conductor 13 is adjacent to the internal electrode 7A in the second direction D2. The conductor 13 is located between the other side surface 3a and the internal electrode 7A. The conductor 13 includes a portion 13a and a portion 13b.

The portion 13a opposes the second electrode layer E2 in the second direction D2. The second electrode layer E2 opposing the portion 13a is not electrically connected to the internal electrode 7A and is disposed on the other side surface 3a. Therefore, the conductor 13 opposes the second electrode layer E2 not electrically connected to the internal electrode 7A, in the second direction D2.

The portion 13b opposes the second electrode layer E2 in the second direction D2. The second electrode layer E2 opposing the portion 13b is electrically connected to the internal electrode 7A and is disposed on the other side surface 3a.

The portion 13a is separated from the portion 13b in the first direction D1 and is not electrically connected to any second electrode layer E2. The portion 13a includes no end exposed to the surface of the element body 3.

The portion 13b is electrically connected to the second electrode layer E2 opposing the portion 13b in the second direction D2. The portion 13b includes an end exposed to the end surface 3e to which the internal electrode 7A is exposed. The portion 13b is directly connected to the external electrode 5 (electrode portion 5e) electrically connected to the internal electrode 7A, at the end exposed to the end surface 3e. The portion 13b is electrically connected to the external electrode 5 to which the internal electrode 7A is electrically connected.

For example, when the portion 13a constitutes a first portion, the portion 13b constitutes a second portion.

The end $7Ae_2$ overlaps the conductor 13 (portion 13a) when viewed from the second direction D2. In the positional relationship between the internal electrode 9A, the second electrode layer E2 not electrically connected to the internal electrode 9A and disposed on the one side surface 3a, and the conductor 13 (portion 13a), the conductor 13 (portion 13a) is located between the internal electrode 9A and the second electrode layer E2. Therefore, in the above-described positional relationship, the internal electrode 9A and the second electrode layer E2 not electrically connected to the internal electrode 9A and disposed on the one side surface 3a do not oppose each other in the second direction D2.

The end $9Ae_2$ overlaps the conductor 11 (portion 11a) when viewed from the second direction D2. In the positional relationship between the internal electrode 7A, the second electrode layer E2 not electrically connected to the internal electrode 7A and disposed on the other side surface 3a, and the conductor 11 (portion 11a), the conductor 11 (portion 11a) is located between the internal electrode 7A and the second electrode layer E2. Therefore, in the above-described positional relationship, the internal electrode 7A and the second electrode layer E2 not electrically connected to the internal electrode 7A and disposed on the other side surface 3a do not oppose each other in the second direction D2.

In the multilayer capacitor $C1_4$, the conductor 11 is located between the second electrode layer E2 and the internal electrode 7A that is not electrically connected to the second electrode layer E2. Due to the conductor 11, the second electrode layer E2 is separated from the internal electrode 7A that is not electrically connected to the second electrode layer E2. Therefore, an electric field tends not to be generated between the second electrode layer E2 and the internal electrode 7A that is not electrically connected to the second electrode layer E2. Even in a case where an electric field is generated between the second electrode layer E2 and the internal electrode 7A that is not electrically connected to the second electrode layer E2, strength of the electric field is small.

The conductor 13 is located between the second electrode layer E2 and the internal electrode 9A that is not electrically connected to the second electrode layer E2. Due to the conductor 13, the second electrode layer E2 is separated from the internal electrode 9A that is not electrically connected to the second electrode layer E2. Therefore, an electric field tends not to be generated between the second electrode layer E2 and the internal electrode 9A that is not electrically connected to the second electrode layer E2. Even in a case where an electric field is generated between the second electrode layer E2 and the internal electrode 9A that is not electrically connected to the second electrode layer E2, strength of the electric field is small.

Consequently, the multilayer capacitor $C1_4$ further controls the occurrence of the migration. Therefore, the insulating film 21 may not include the film portion 21b.

In the multilayer capacitor $C1_4$, the conductor 11 includes the portion 11a and the portion 11b, and the conductor 13 includes the portion 13a and the portion 13b.

The portion 11a opposes the second electrode layer E2 not electrically connected to the internal electrode 9A adjacent to the conductor 11 in the second direction D2, in the second direction D2. The portion 11b opposes the second electrode layer E2 electrically connected to the internal electrode 9A, in the second direction D2.

The portion 13a opposes the second electrode layer E2 not electrically connected to the internal electrode 7A adjacent to the conductor 13 in the second direction D2, in the second direction D2. The portion 13b opposes the second electrode layer E2 electrically connected to the internal electrode 7A, in the second direction D2.

In the multilayer capacitor $C1_4$, the configuration on the one end surface 3e side from the center in the first direction D1 and the configuration on the other end surface 3e side from the center in the first direction D1 tend not to be different from each other. Therefore, structural defects tend not to occur in the element body 3.

In the multilayer capacitor $C1_4$, the end $7Ae_2$ overlaps the conductor 13 (portion 13a) when viewed from the second direction D2. Therefore, an electric field further tends not to be generated between the second electrode layer E2 and the internal electrode 7A that is not electrically connected to the second electrode layer E2. The end $9Ae_2$ overlaps the conductor 11 (portion 11a) when viewed from the second direction D2. Therefore, an electric field further tends not to be generated between the second electrode layer E2 and the internal electrode 9A that is not electrically connected to the second electrode layer E2. Consequently, the multilayer capacitor $C1_4$ further controls the occurrence of the migration.

Figure 15:
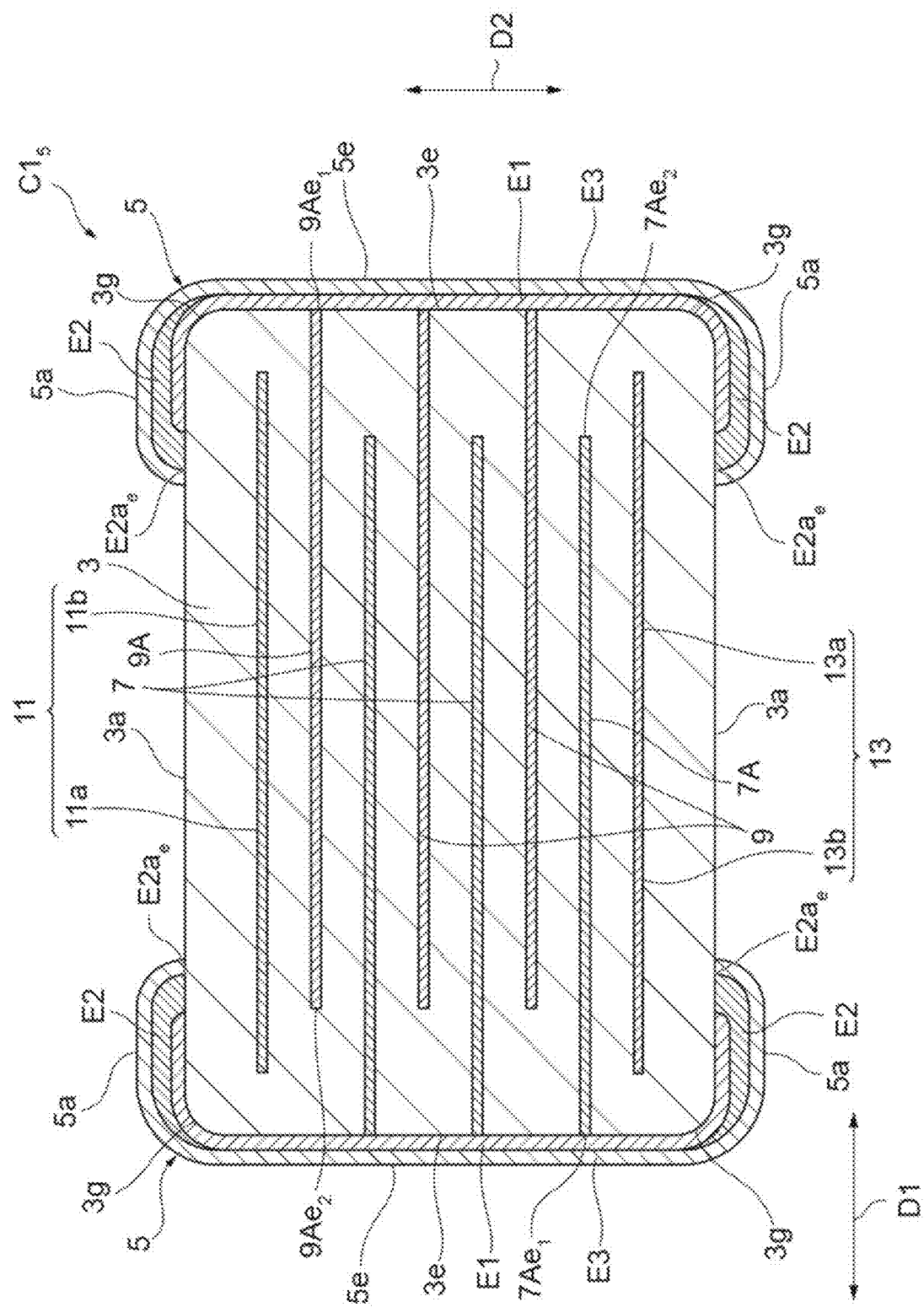
FIG. 15 is a view illustrating a cross-sectional configuration of a multilayer capacitor according to a modification of the first embodiment.
Figure 16:
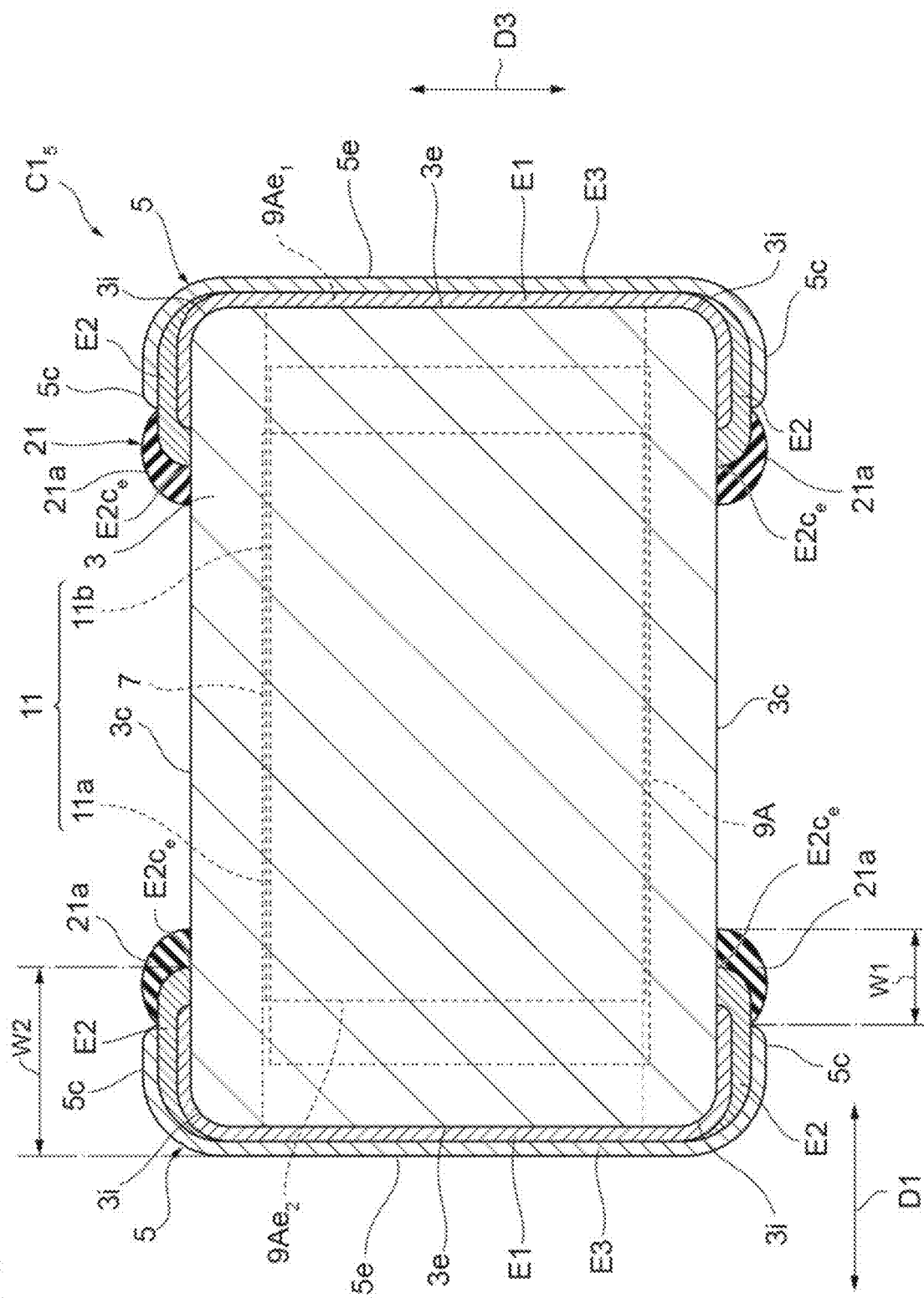
FIG. 16 is a view illustrating a e cross-sectional configuration of the multilayer capacitor according to the modification of the first embodiment.
Figure 17:
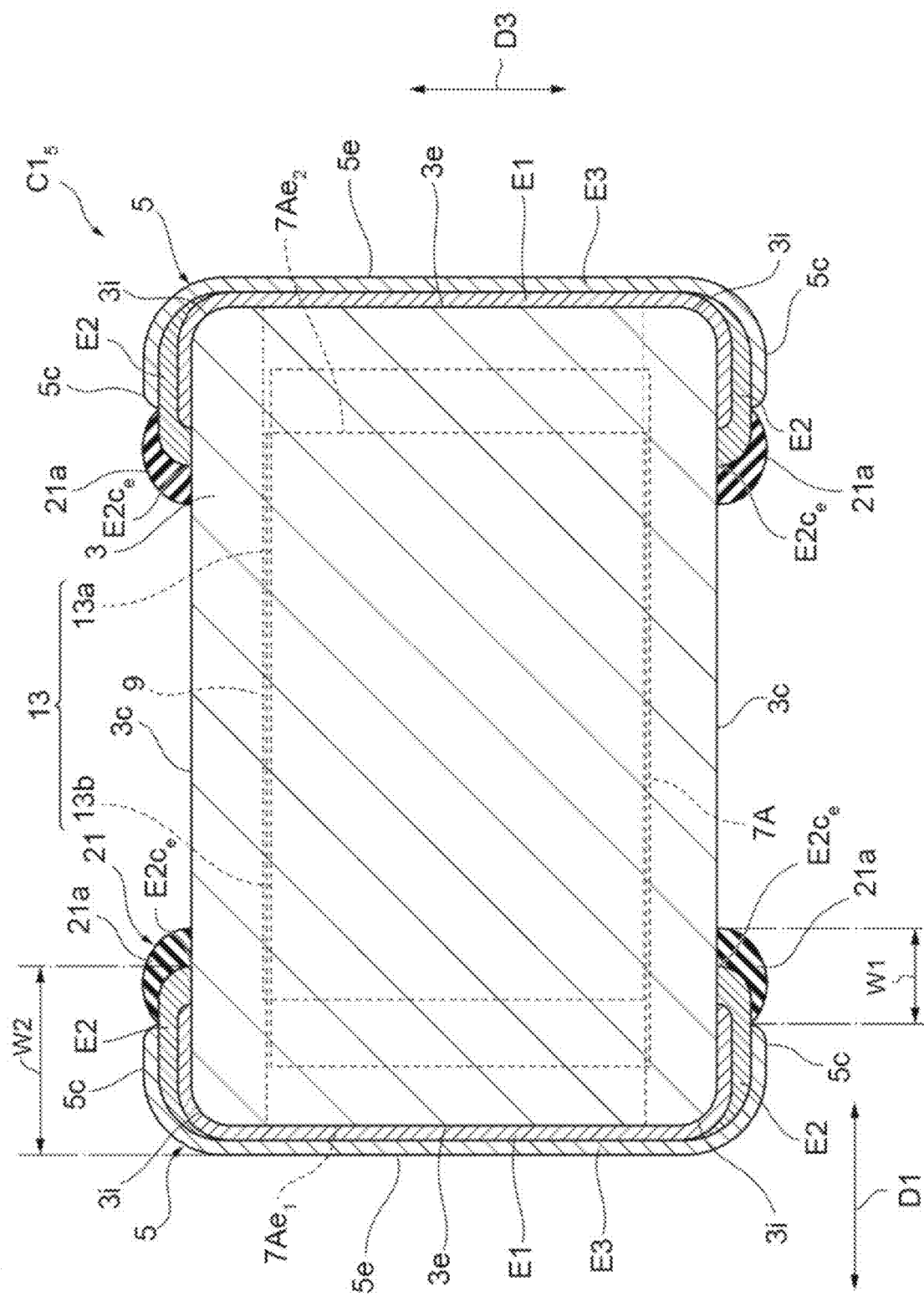
FIG. 17 is a view illustrating a cross-sectional configuration of the multilayer capacitor according to the modification of the first embodiment.

Next, a configuration of a multilayer capacitor $C1_5$ according to a modification of the first embodiment will be described with reference to FIGS. 15 to 17. FIGS. 15, 16, and 17 are views illustrating a cross-sectional configuration of a multilayer capacitor according to the modification of the first embodiment. The multilayer capacitor $C1_5$ according to this modification is generally similar to or the same as the multilayer capacitor $C1_4$ illustrated in FIGS. 12 to 14. However, this modification is different from the multilayer capacitor $C1_4$ in the configuration of the conductors 11 and 13. Hereinafter, differences between the multilayer capacitor $C1_4$ and this modification will be mainly described.

In the multilayer capacitor $C1_5$, the portion 11a and the portion 11b are integrated. The conductor 11 includes no end exposed to the surface of the element body 3. The conductor 11 is not connected to any of the external electrodes 5. The conductor 11 is not electrically connected to the second electrode layer E2.

The portion 13a and the portion 13b are integrated. The conductor 13 includes no end exposed to the surface of the element body 3. The conductor 13 is not connected to any of the external electrodes 5. The conductor 13 is not electrically connected to the second electrode layer E2.

The end $7Ae_2$ opposes the second electrode layer E2 not electrically connected to the internal electrode 7A and disposed on the other side surface 3a, in the second direction D2. The end $7Ae_2$ is exposed from the conductor 13 (portion 13a) when viewed from the second direction D2.

The end $9Ae_2$ opposes the second electrode layer E2 not electrically connected to the internal electrode 9A and disposed on the one side surface 3a, in the second direction D2. The end $9Ae_2$ is exposed from the conductor 11 (portion 11a) when viewed from the second direction D2.

In the multilayer capacitor $C1_5$, the lengths of the internal electrodes 7 and 9 in the second direction D2 increase, and then capacitance of the multilayer capacitor can be increased.

Figure 18:
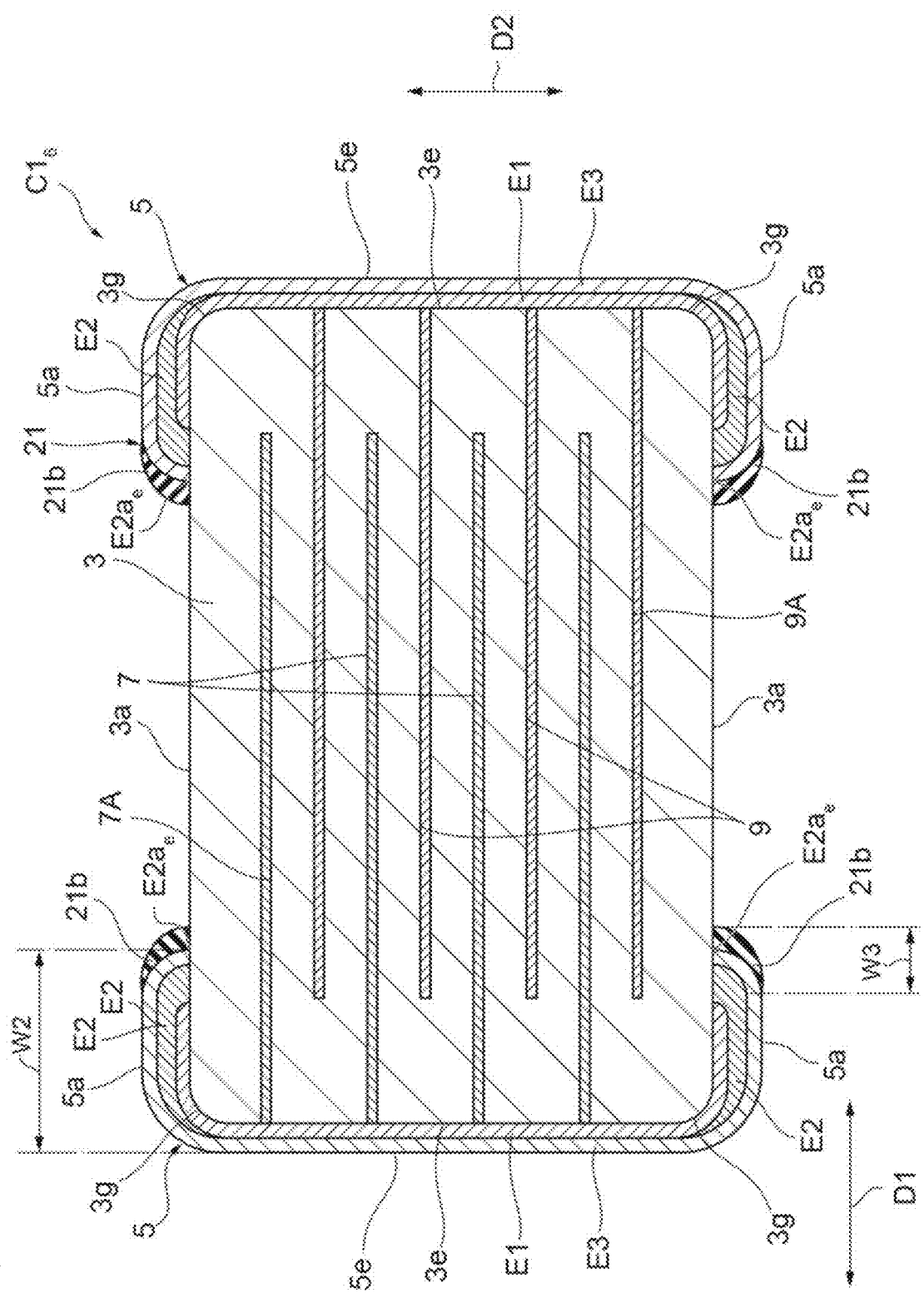
FIG. 18 is a view illustrating a cross-sectional configuration of a multilayer capacitor according to a modification of the first embodiment.
Figure 19:
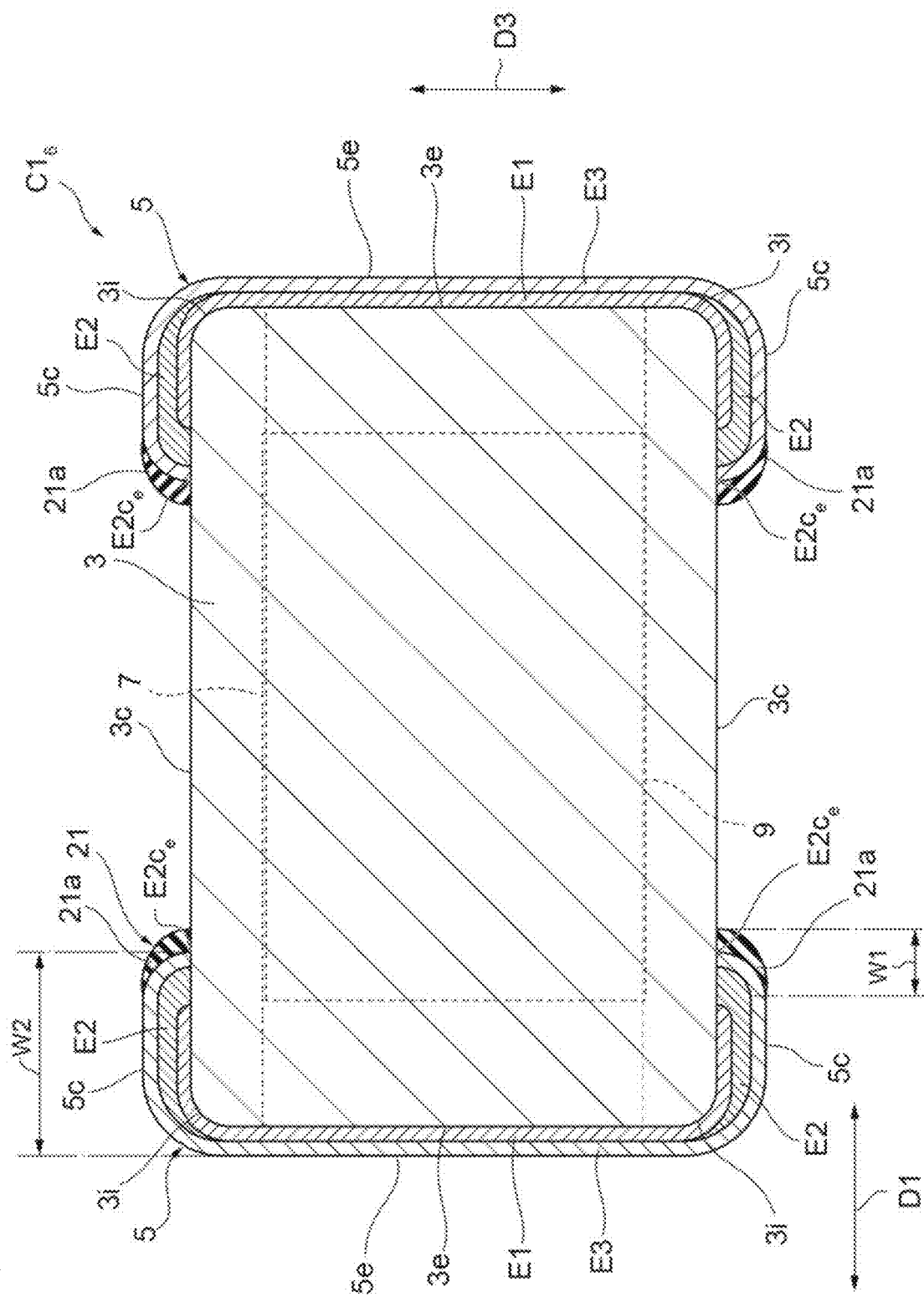
FIG. 19 is a view illustrating a cross-sectional configuration of the multilayer capacitor according to the modification of the first embodiment.

Next, a configuration of a multilayer capacitor $C1_6$ according to a modification of the first embodiment will be described with reference to FIGS. 18 and 19. FIGS. 18 and 19 are views illustrating a cross-sectional configuration of a multilayer capacitor according to the modification of the first embodiment. The multilayer capacitor $C1_6$ according to this modification is generally similar to or the same as the multilayer capacitor C1 described above. However, this modification is different from the above-described first embodiment in the configuration of the electrode portions 5a and 5c and the insulating film 21. Hereinafter, differences between the above-described first embodiment and this modification will be mainly described.

In the multilayer capacitor $C1_6$, the film portion 21a is in direct contact with the third electrode layer E3 and the side surface 3c. The film portion 21a is disposed to indirectly cover the edge $E2c_e$ and directly cover the side surface 3c. In the electrode portion 5c, the film portion 21a indirectly covers a part of the second electrode layer E2. The part of the second electrode layer E2 indirectly covered with the film portion 21a includes the edge $E2c_e$.

The film portion 21b is in direct contact with the third electrode layer E3 and the side surface 3a. The film portion 21b is disposed to indirectly cover the edge $E2a_e$ and directly cover the side surface 3a. In the electrode portion 5a, the film portion 21b indirectly covers a part of the second electrode layer E2. The part of the second electrode layer E2 indirectly covered with the film portion 21b includes the edge $E2a_e$.

In the multilayer capacitor $C1_6$, the second electrode layer E2 of the electrode portion 5a is formed to cover the entire first electrode layer E1 of the electrode portion 5a. The second electrode layer E2 of the electrode portion 5c is formed to cover the entire first electrode layer E1 of the electrode portion 5c.

Even in the multilayer capacitor $C1_6$, metal ions tend not to migrate from the second electrode layer E2 of the electrode portion 5c even in a case where the metal ions are generated in the second electrode layer E2 of the electrode portion 5c due to an electric field generated between the internal electrodes 7 and the second electrode layer E2 of the electrode portion 5c not electrically connected to the internal electrodes 7 or an electric field generated between the internal electrodes 9 and the second electrode layer E2 of the electrode portion 5c not electrically connected to the internal electrodes 9. The film portion 21a regulates migration of the metal ions. Consequently, the multilayer capacitor $C1_6$ controls the occurrence of the migration.

Metal ions tend not to migrate from the second electrode layer E2 of the electrode portion 5a even in a case where the metal ions are generated in the second electrode layer E2 of the electrode portion 5a due to an electric field generated between the internal electrode 7A and the second electrode layer E2 of the electrode portion 5a not electrically connected to the internal electrode 7A or an electric field generated between the internal electrode 9A and the second electrode layer E2 of the electrode portion 5a not electrically connected to the internal electrode 9A. The film portion 21b regulates migration of the metal ions. Consequently, the multilayer capacitor $C1_6$ further controls the occurrence of the migration.

Second Embodiment

Figure 20:
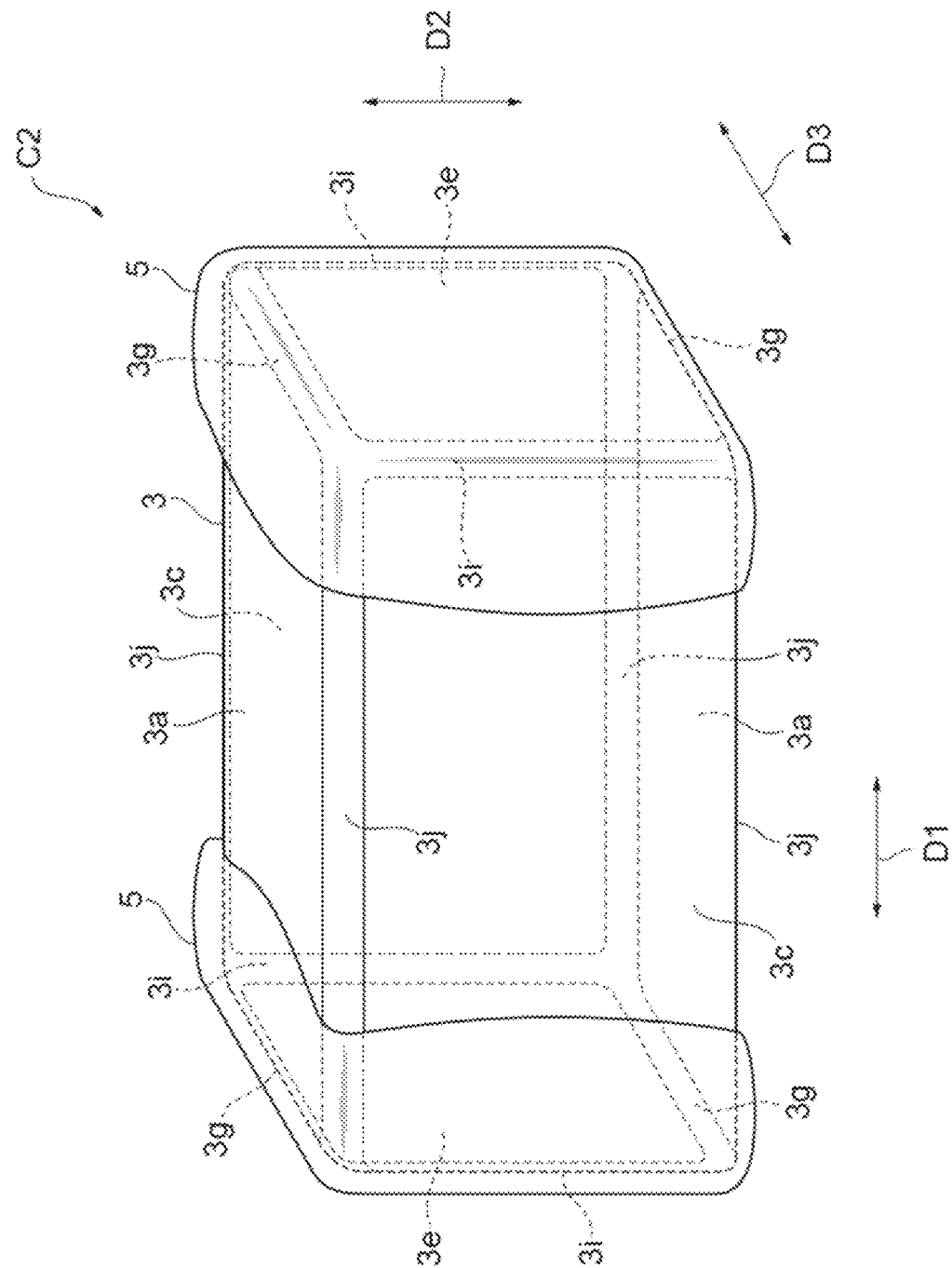
FIG. 20 is a perspective view of a multilayer capacitor according to a second embodiment.
Figure 21:
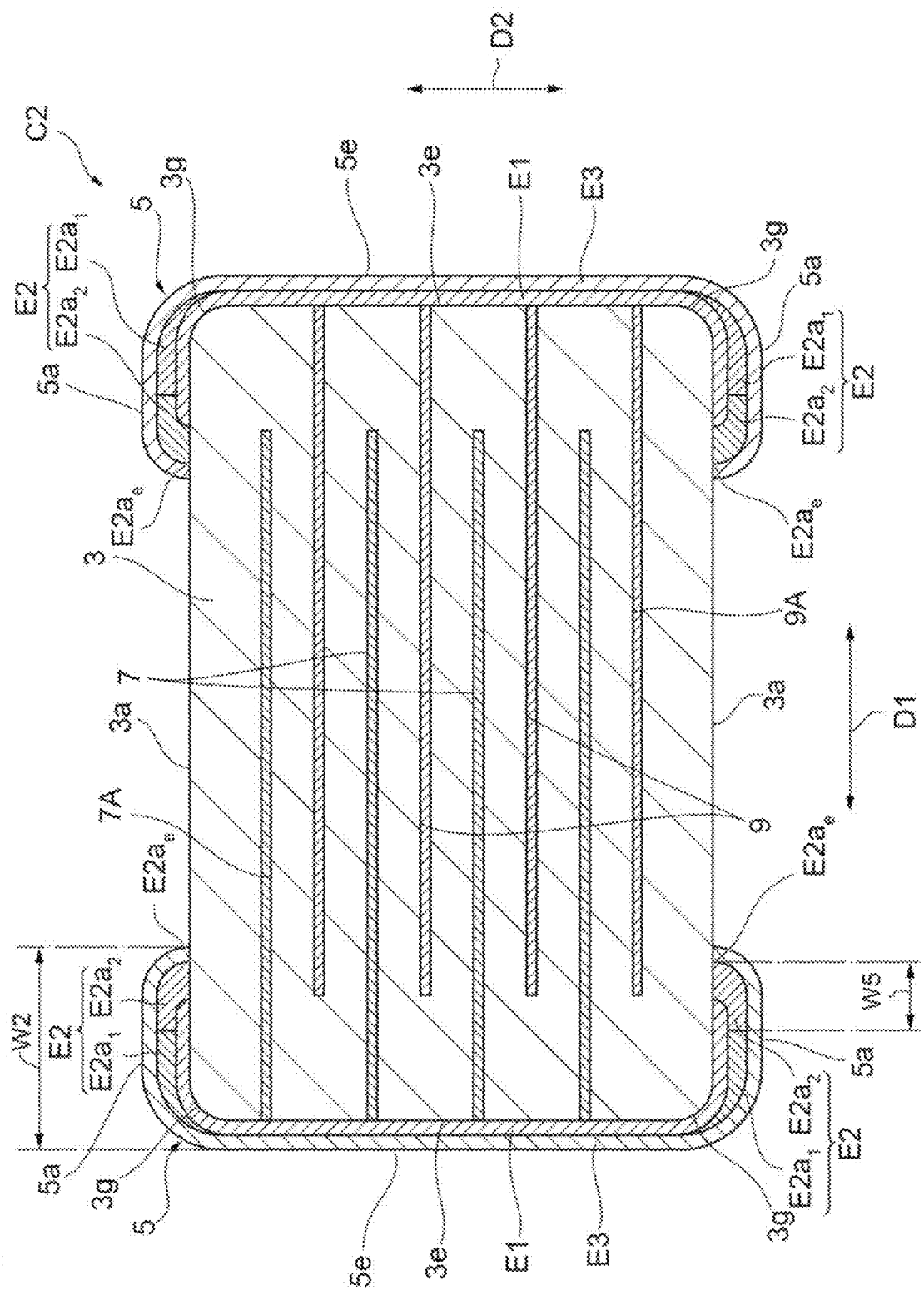
FIG. 21 is a view illustrating a cross-sectional configuration of the multilayer capacitor according to the second embodiment.
Figure 22:
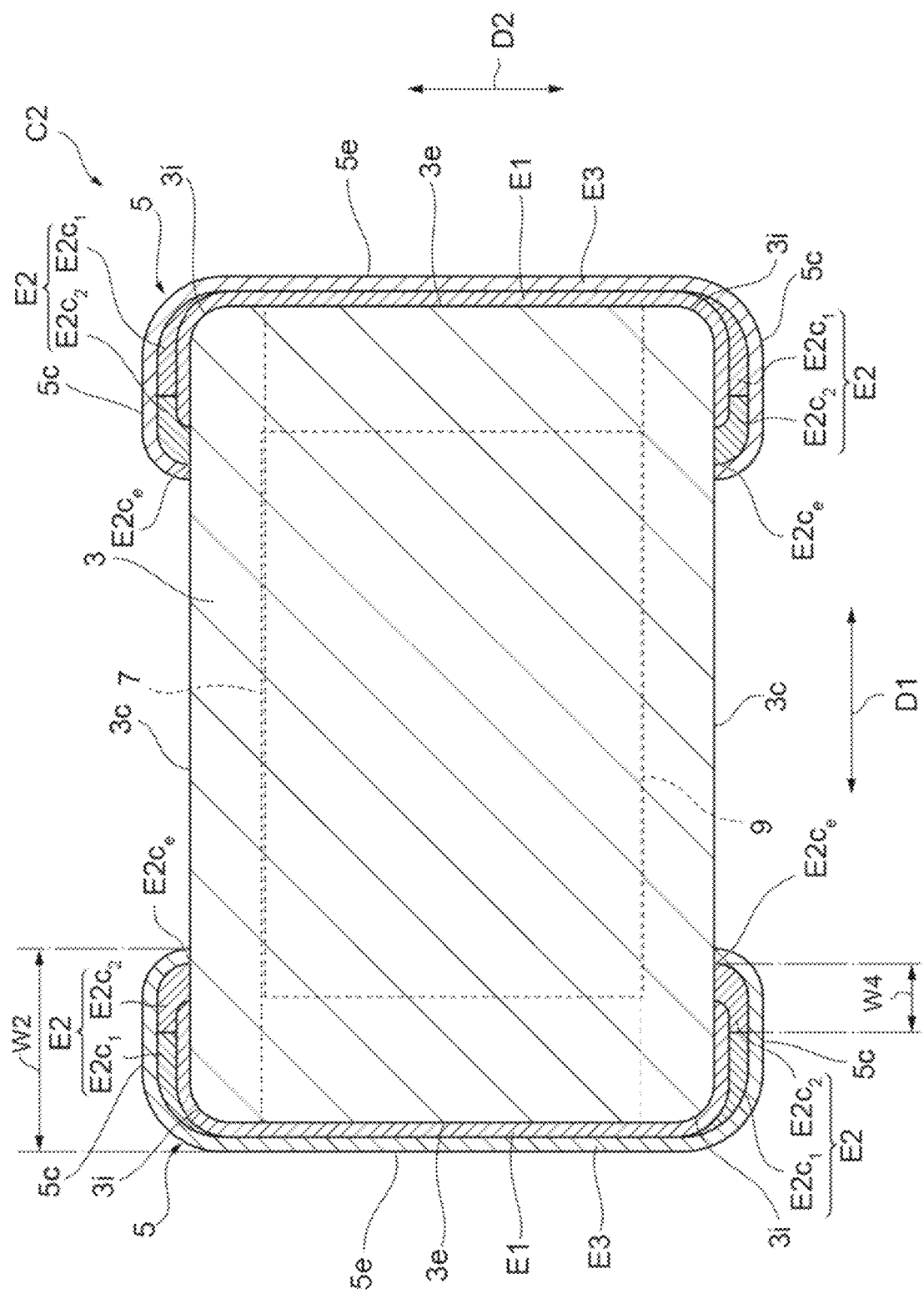
FIG. 22 is a view illustrating a cross-sectional configuration of the multilayer capacitor according to the second embodiment.

A configuration of a multilayer capacitor C2 according to a second embodiment will be described with reference to FIGS. 20 to 22. FIG. 20 is a perspective view of the multilayer capacitor according to the second embodiment. FIGS. 21 and 22 are views illustrating a cross-sectional configuration of the multilayer capacitor according to the second embodiment. The multilayer capacitor C2 is generally similar to or the same as the multilayer capacitor C1. However, the multilayer capacitor C2 is different from the multilayer capacitor C1 in the configuration of the second electrode layer E2. The multilayer capacitor C2 is different from the multilayer capacitor C1 in that the insulating film 21 is not provided. Hereinafter, differences between the multilayer capacitor C1 and the multilayer capacitor C2 will be mainly described. Also in the present embodiment, an electronic component includes, for example, the multilayer capacitor C2.

As illustrated in FIGS. 20 to 22, the multilayer capacitor C2 includes an element body 3, a plurality of external electrodes 5, a plurality of internal electrodes 7, and a plurality of internal electrodes 9. The multilayer capacitor C2 does not include the insulating film 21 included in the multilayer capacitor C1. In the present embodiment, the multilayer capacitor C2 includes a pair of external electrodes 5.

The external electrode 5 includes a plurality of electrode portions 5a, 5c, and 5e. Each of the electrode portions 5a and 5c includes a first electrode layer E1, a second electrode layer E2, and a third electrode layer E3. Each electrode portion 5e includes the first electrode layer E1 and the third electrode layer E3.

The second electrode layer E2 of the electrode portion 5c is located on the side surface 3c. Each second electrode layer E2 located on the same side surface 3c includes an edge $E2c_e$. On the same side surface 3c, the edge $E2c_e$ of one second electrode layer E2 opposes the edge $E2c_e$ of the other second electrode layer E2.

In the electrode portion 5c, each second electrode layer E2 includes a region $E2c_1$ and a region $E2c_2$. The region $E2c_2$ is located closer to the edge E2e than the region $E2c_1$, and includes the edge $E2c_e$. A content of the metal particles in the region $E2c_2$ is smaller than a content of the metal particles in the region $E2c_1$. The content of the metal particles in the region $E2c_2$ is, for example, less than 30 vol %. The content of the metal particles in the region $E2c_1$ is, for example, 30 vol % or more. In the present embodiment, the content of the metal particles in the region $E2c_2$ is about 25 vol %, and the content of the metal particles in the region $E2c_1$ is about 50 vol %.

The second electrode layer E2 of the electrode portion 5a is located on the side surface 3a. Each second electrode layer E2 located on the same side surface 3a includes an edge $E2a_e$. On the same side surface 3a, the edge $E2a_e$ of one second electrode layer E2 opposes the edge $E2a_e$ of the other second electrode layer E2.

In the electrode portion 5a, each second electrode layer E2 includes a region $E2a_1$ and a region $E2a_2$. The region $E2a_2$ is located closer to the edge $E2a_e$ than the region $E2a_1$, and includes the edge $E2a_e$. A content of the metal particles in the region $E2a_2$ is smaller than a content of the metal particles in the region $E2a_1$. The content of the metal particles in the region $E2a_2$ is, for example, less than 30 vol %. The content of the metal particles in the region $E2a_1$ is, for example, 30 vol % or more. In the present embodiment, the content of the metal particles in the region $E2a_2$ is about 25 vol %, and the content of the metal particles in the region $E2a_1$ is about 50 vol %.

For example, when the region $E2c_1$ constitutes a first region, the region $E2c_2$ constitutes a second region, the region $E2a_1$ constitutes a third region, and the region $E2a_2$ constitutes a fourth region. For example, when the content of the metal particles in the region $E2c_1$ is a first content, the content of the metal particles in the region $E2c_2$ is a second content, the content of the metal particles in the region $E2a_1$ is a third content, and the content of the metal particles in the region E2a2 is a fourth content.

A width W4 of the region $E2c_2$ is 5% or more of the width W2, as illustrated in FIG. 21. The width W4 is the length of the region $E2c_2$ in the first direction D1.

A width W5 of the region $E2a_2$ is 5% or more of the width W2, as illustrated in FIG. 22. The width W5 is the length of the region $E2a_2$ in the first direction D1. The width W5 may be the same as the width W4 or may be different from the width W4.

In the multilayer capacitor C2, the electrode portion 5c includes the second electrode layer E2. Therefore, the multilayer capacitor C2 controls occurrence of cracks in the element body 3 in the same manner as the multilayer capacitor C1.

In the multilayer capacitor C2, the electrode portion 5a includes the second electrode layer E2. Therefore, the multilayer capacitor C2 further controls the occurrence of cracks in the element body 3 in the same manner as the multilayer capacitor C1.

In the multilayer capacitor C2, the region $E2c_2$ constitutes the edge $E2c_e$ of the second electrode layer E2 included in the electrode portion 5c. The content of the metal particles in the region $E2c_2$ is smaller than the content of the metal particles in the region $E2c_1$. An amount of metal ions generated in the region $E2c_2$ is small, as compared with that in the region $E2c_1$ even in a case where the metal ions are generated in the second electrode layer E2 of the electrode portion 5c due to an electric field generated between the internal electrodes 7 and the second electrode layer E2 of the electrode portion 5c not electrically connected to which the internal electrodes 7 or an electric field generated between the internal electrodes 9 and the second electrode layer E2 of the electrode portion 5c not electrically connected to which the internal electrodes 9. Therefore, in the multilayer capacitor C2, an amount of metal ions migrating from the second electrode layer E2 of the electrode portion 5c is small, as compared with that in the configuration in which the second electrode layer E2 of the electrode portion 5c is the region $E2c_1$. Consequently, the multilayer capacitor C2 controls occurrence of migration.

In the multilayer capacitor C2, the region $E2a_2$ constitutes the edge $E2a_e$ of the second electrode layer E2 included in the electrode portion 5a. The content of the metal particles in the region $E2a_2$ is smaller than the content of the metal particles in the region $E2a_1$. An amount of metal ions generated in the region $E2a_2$ is small, as compared with that in the region $E2a$ even in a case where the metal ions are generated in the second electrode layer E2 of the electrode portion 5a due to an electric field generated between the internal electrode 7A and the second electrode layer E2 of the electrode portion 5a not electrically connected to the internal electrode 7A or an electric field generated between the internal electrode 9A and the second electrode layer E2 of the electrode portion 5a not electrically connected to the internal electrode 9A. Therefore, in the multilayer capacitor C2, an amount of metal ions migrating from the second electrode layer E2 of the electrode portion 5a is small, as compared with that in the configuration in which the second electrode layer E2 of the electrode portion 5a is the region $E2a_1$. Consequently, the multilayer capacitor C2 further controls the occurrence of the migration.

The second electrode layer E2 includes the plurality of silver particles. Silver particles tend to cause migration as compared with, for example, copper particles.

The multilayer capacitor C2 reliably controls the occurrence of the migration even when the second electrode layer E2 includes the plurality of silver particles.

Figure 23:
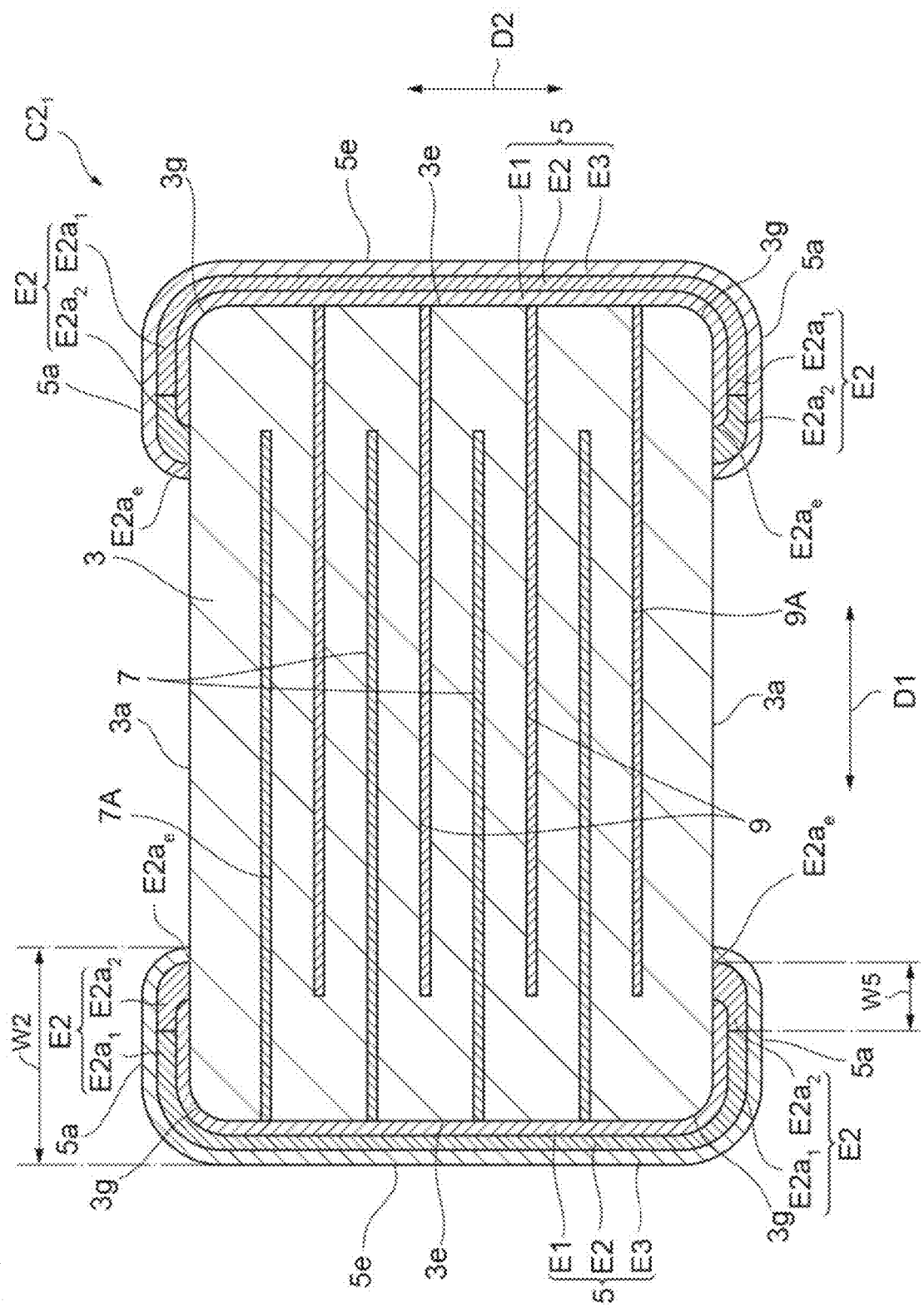
FIG. 23 is a view illustrating a cross-sectional configuration of a multilayer capacitor according to a modification of the second embodiment.

Next, a configuration of a multilayer capacitor $C2_1$ according to a modification of the second embodiment will be described with reference to FIG. 23. FIG. 23 is a view illustrating a cross-sectional configuration of a multilayer capacitor according to the modification of the second embodiment. The multilayer capacitor $C2_1$ according to this modification is generally similar to or the same as the multilayer capacitor C2 described above. However, this modification is different from the above-described second embodiment in the configuration of the electrode portion 5e. Hereinafter, differences between the above-described second embodiment and this modification will be mainly described. This modification is similar to the multilayer capacitor $C1_1$ illustrated in FIG. 7 in the configuration of the electrode portion 5e.

Each electrode portion 5e includes a first electrode layer E1, a second electrode layer E2, and a third electrode layer E3, as in the multilayer capacitor $C1_1$.

The configuration in which the electrode portion 5e includes the second electrode layer E2 reduces stress acting on the solder fillet formed on the electrode portion 5e. Therefore, the multilayer capacitor $C2_1$ controls occurrence of solder cracks.

Figure 24:
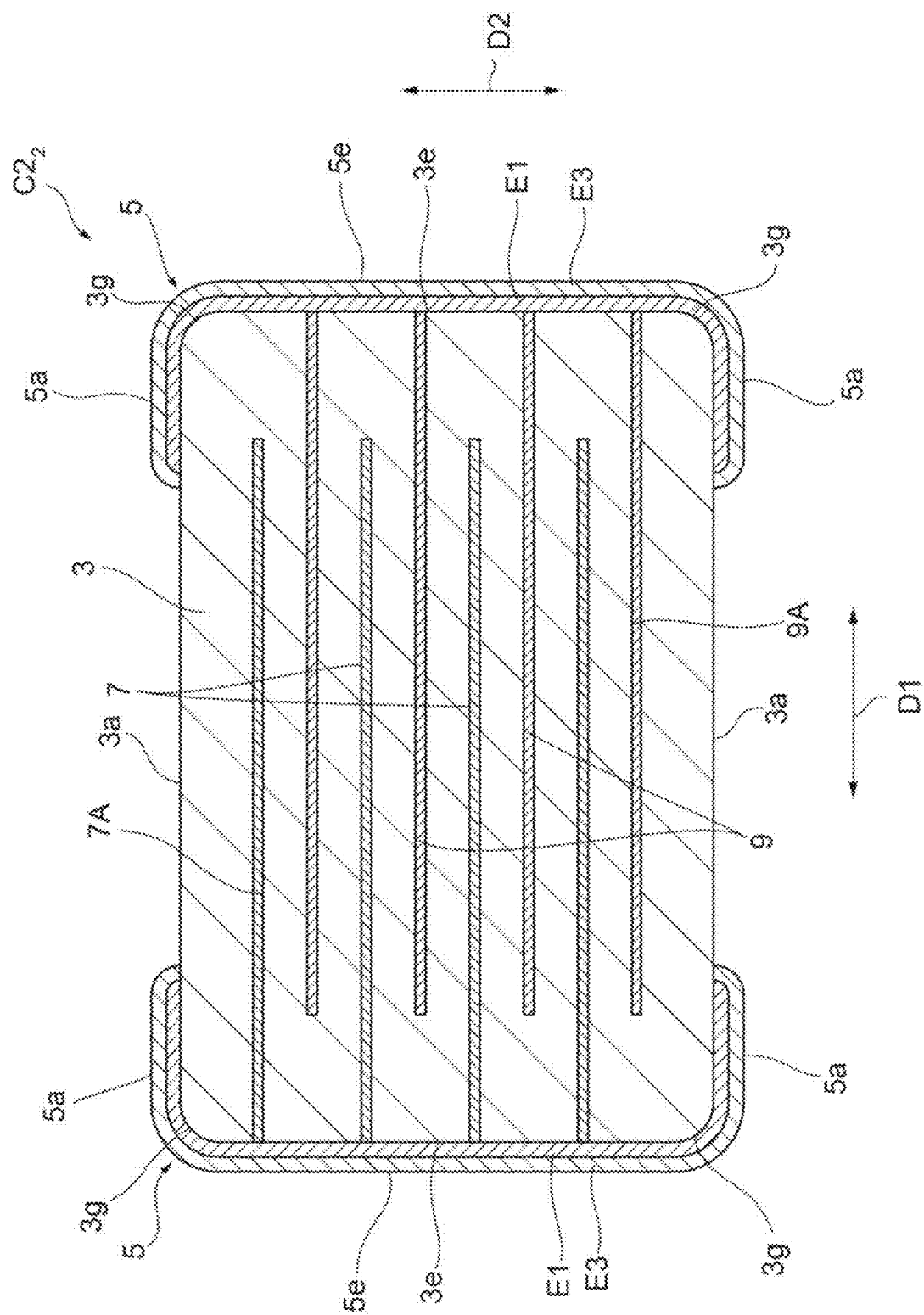
FIG. 24 is a view illustrating a cross-sectional configuration of a multilayer capacitor according to a modification of the second embodiment.

Next, a configuration of a multilayer capacitor $C2_2$ according to a modification of the second embodiment will be described with reference to FIG. 24. FIG. 24 is a view illustrating a cross-sectional configuration of a multilayer capacitor according to the modification of the second embodiment. The multilayer capacitor $C2_2$ according to this modification is generally similar to or the same as the multilayer capacitor C2 described above. However, this modification is different from the above-described second embodiment in the configuration of the electrode portion 5a. Hereinafter, differences between the above-described second embodiment and this modification will be mainly described. This modification is similar to the multilayer capacitor $C1_2$ illustrated in FIG. 8 in the configuration of the electrode portion 5a.

The electrode portion 5a may not include the second electrode layer E2 similarly to the electrode portion 5a of the multilayer capacitor $C1_2$.

In the configuration in which the electrode portion 5a does not include the second electrode layer E2, the second electrode layer E2 and the internal electrode 7 that are not electrically connected to each other do not oppose each other in the second direction D2, and the second electrode layer E2 and the internal electrode 9 that are not electrically connected to each other do not oppose each other in the second direction D2. Therefore, also the multilayer capacitor $C2_2$ further controls the occurrence of the migration.

Figure 25:
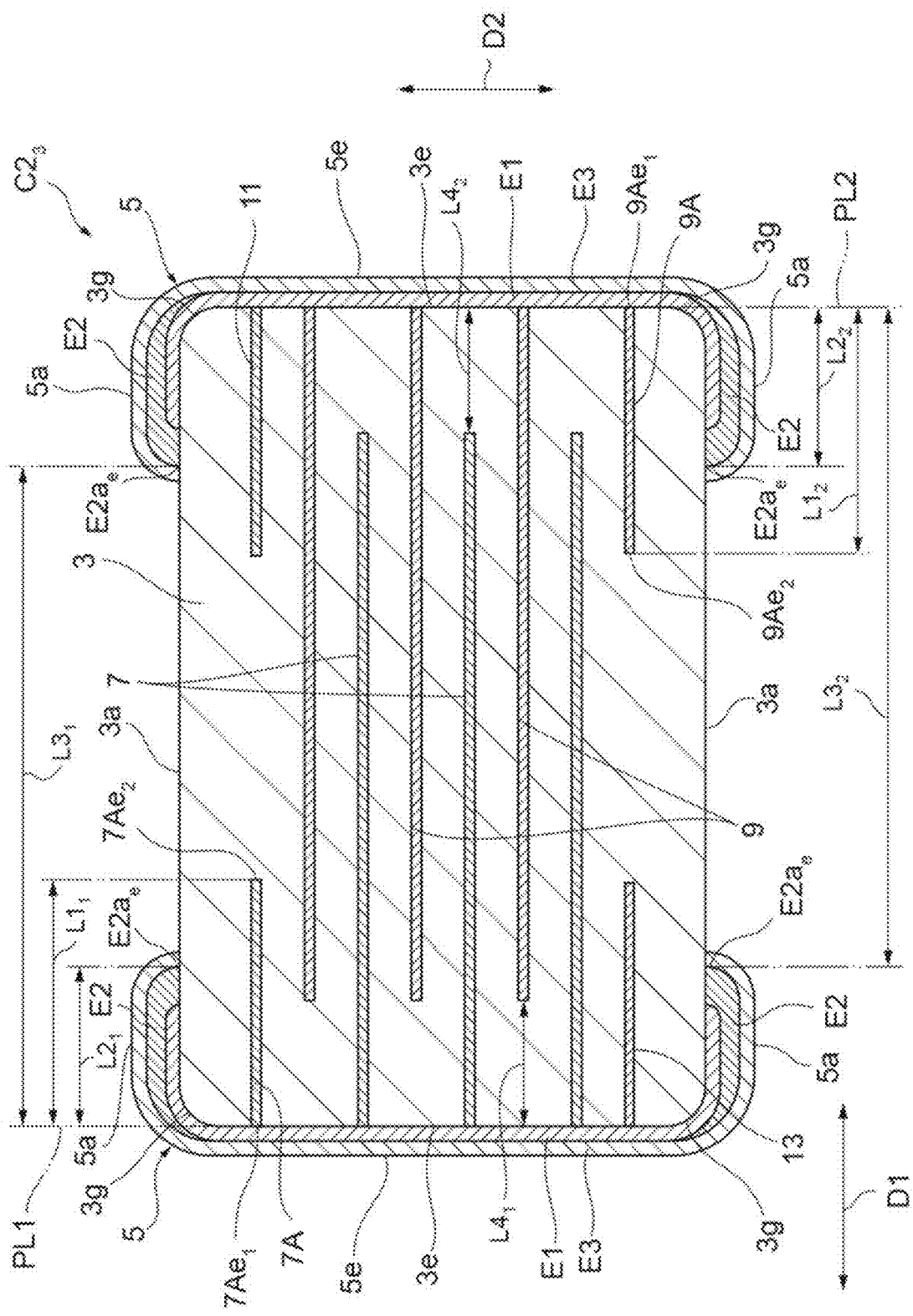
FIG. 25 is a view illustrating a cross-sectional configuration of a multilayer capacitor according to a modification of the second embodiment.
Figure 26:
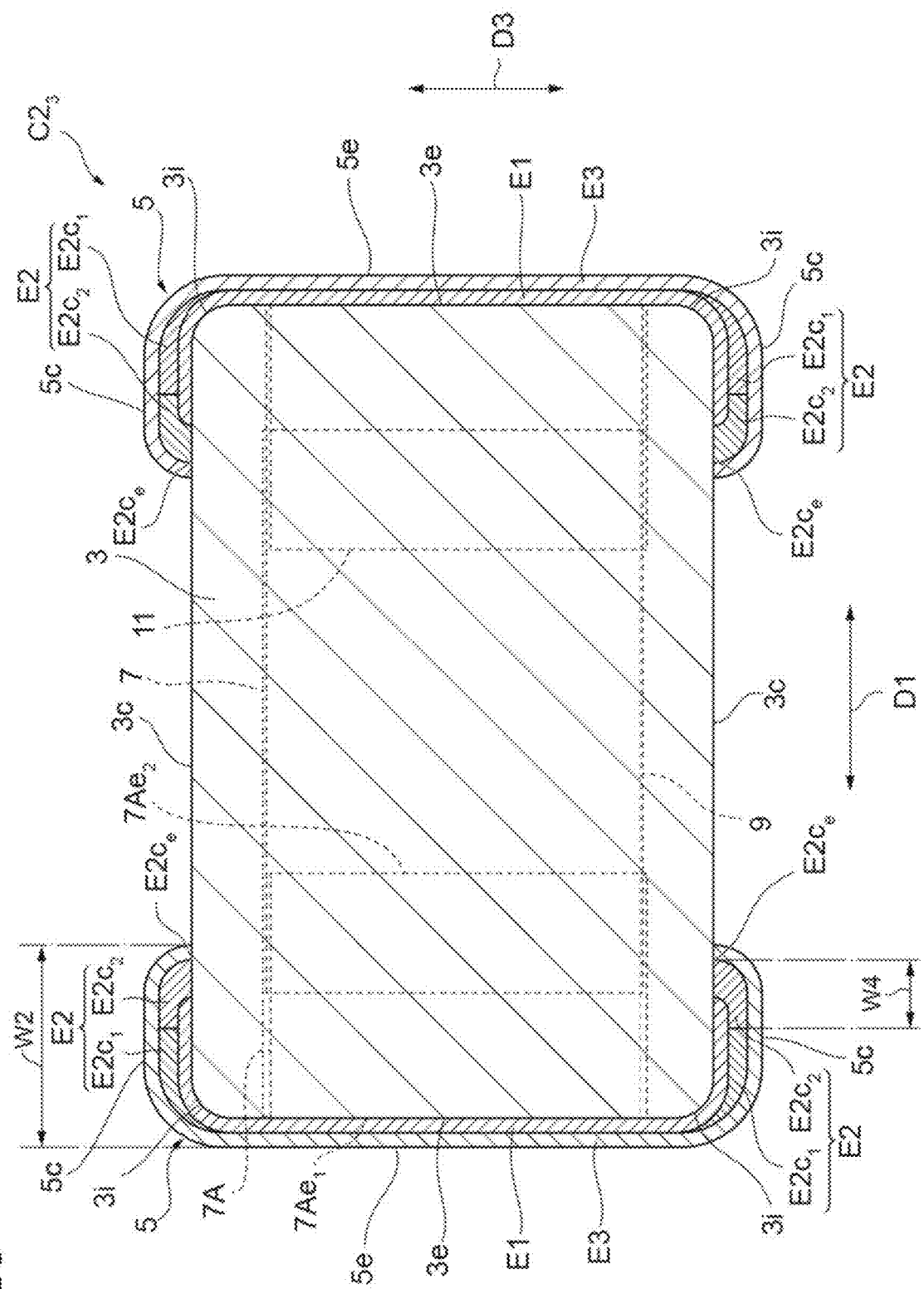
FIG. 26 is a view illustrating a cross-sectional configuration of the multilayer capacitor according to the modification of the second embodiment.
Figure 27:
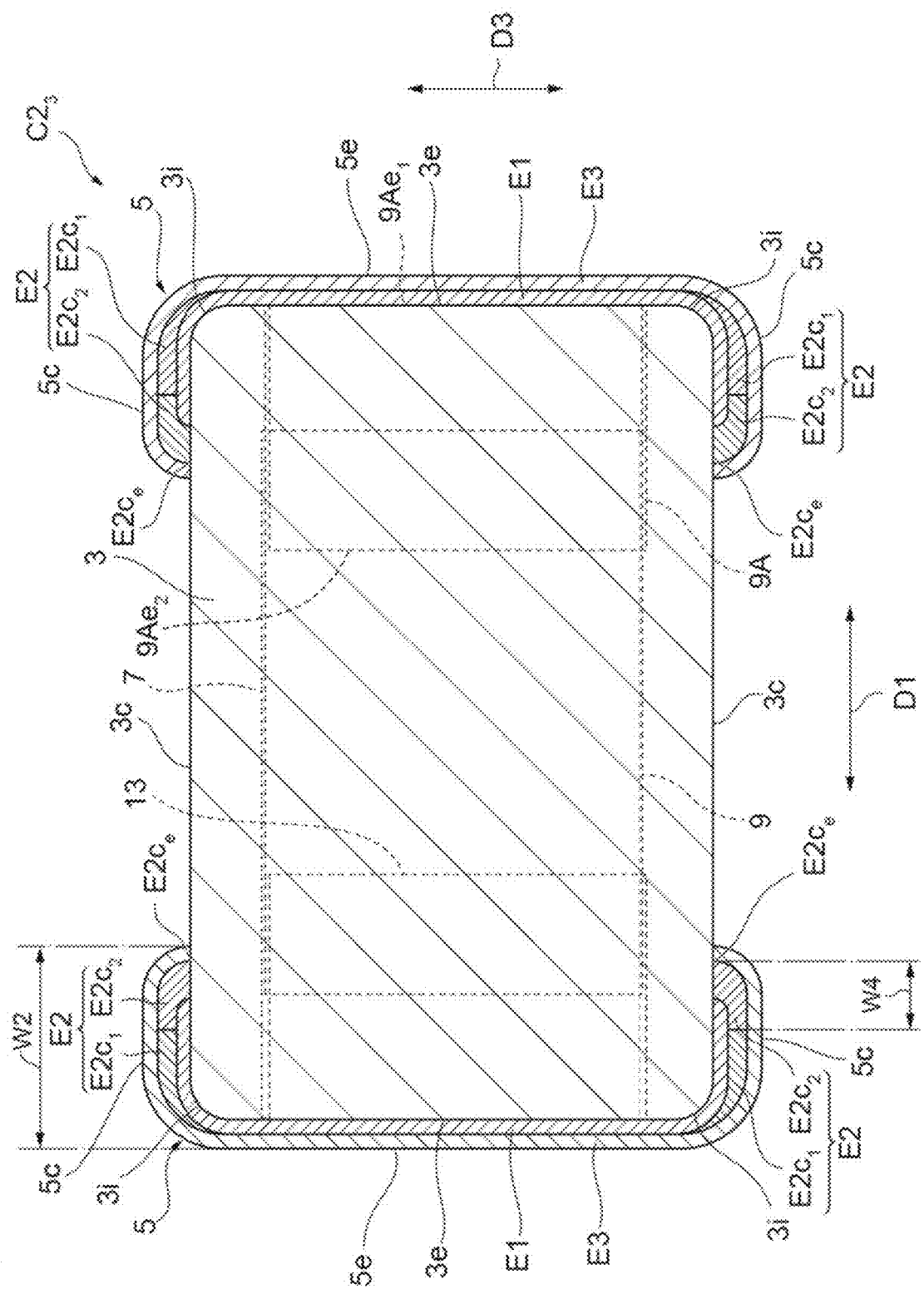
FIG. 27 is a view illustrating a cross-sectional configuration of the multilayer capacitor according to the modification of the second embodiment.

Next, a configuration of a multilayer capacitor $C2_3$ according to a modification of the second embodiment will be described with reference to FIGS. 25 to 27. FIGS. 25, 26, and 27 are views illustrating a cross-sectional configuration of a multilayer capacitor according to the modification of the second embodiment. The multilayer capacitor $C2_3$ according to this modification is generally similar to or the same as the multilayer capacitor C2 described above. However, this modification is different from the above-described second embodiment in the configuration of the internal electrodes 7A and 9A. Hereinafter, differences between the above-described second embodiment and this modification will be mainly described. This modification is similar to the multilayer capacitor $C1_3$ illustrated in FIGS. 9 to 11 in the configuration of the internal electrodes 7A and 9A.

In the multilayer capacitor $C2_3$, the lengths $L1_1$ and $L1_2$ are larger than the lengths $L2_1$ and $L2_2$, as in the multilayer capacitor $C1_3$. In the multilayer capacitor $C2_3$, the length $L2_1$ is a length in the first direction D1 from the reference plane PL1 to the edge $E2a_e$ of the second electrode layer E2 electrically connected to the internal electrode 7A, and the length $L2_2$ is a length in the first direction D1 from the reference plane PL2 to the edge $E2a_e$ of the second electrode layer E2 electrically connected to the internal electrode 9A. Therefore, the internal electrode 9 adjacent to the internal electrode 7A in the second direction D2 and the second electrode layer E2 included in the electrode portion 5a adjacent to the internal electrode 7A in the second direction D2 are not electrically connected to each other, but tend not to oppose each other in the second direction D2. The internal electrode 7 adjacent to the internal electrode 9A in the second direction D2 and the second electrode layer E2 included in the electrode portion 5a adjacent to the internal electrode 9A in the second direction D2 are not electrically connected to each other, but tend not to oppose each other in the second direction D2. An electric field tends not to be generated between the second electrode layer E2 and the internal electrode 7 that are not electrically connected to each other, and between the second electrode layer E2 and the internal electrode 9 that are not electrically connected to each other.

The lengths $L1_1$ and $L1_2$ are smaller than the lengths $L3_1$ and $L3_2$. In the multilayer capacitor $C2_3$, the length $L3_1$ is a length in the first direction D1 from the reference plane PL1 to the edge $E2a_e$ of the second electrode layer E2 to which the internal electrode 7A is not electrically connected, and the length $L3_2$ is a length in the first direction D1 from the reference plane PL2 to the edge $E2a_e$ of the second electrode layer E2 to which the internal electrode 9A is not electrically connected. Therefore, the internal electrode 7A tends not to oppose the second electrode layer E2 included in the electrode portion 5a not electrically connected to the internal electrode 7A, in the second direction D2, and the internal electrode 9A tends not to oppose the second electrode layer E2 included in the electrode portion 5a not electrically connected to the internal electrode 9A, in the second direction D2. An electric field tends not to be generated between the second electrode layer E2 and the internal electrode 7A that are not electrically connected to each other, and between the second electrode layer E2 and the internal electrode 9A that are not electrically connected to each other.

Consequently, the multilayer capacitor $C2_3$ further controls the occurrence of the migration. Therefore, the second electrode layer E2 included in the electrode portion 5a may not include the region $E2a_2$. Although not illustrated, the second electrode layer E2 included in the electrode portion 5a may include the region $E2a_2$.

Figure 28:
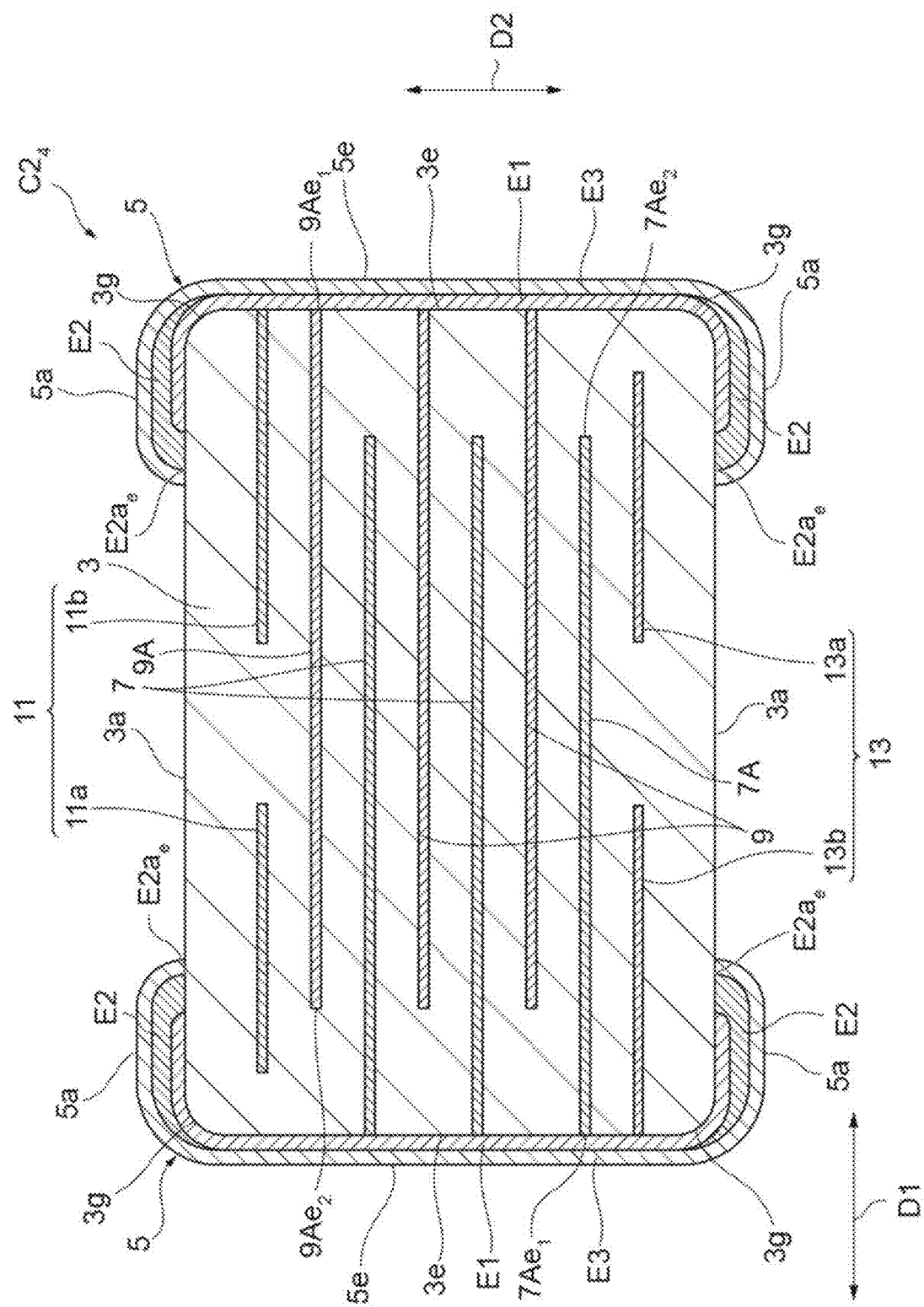
FIG. 28 is a view illustrating a cross-sectional configuration of a multilayer capacitor according to a modification of the second embodiment.
Figure 29:
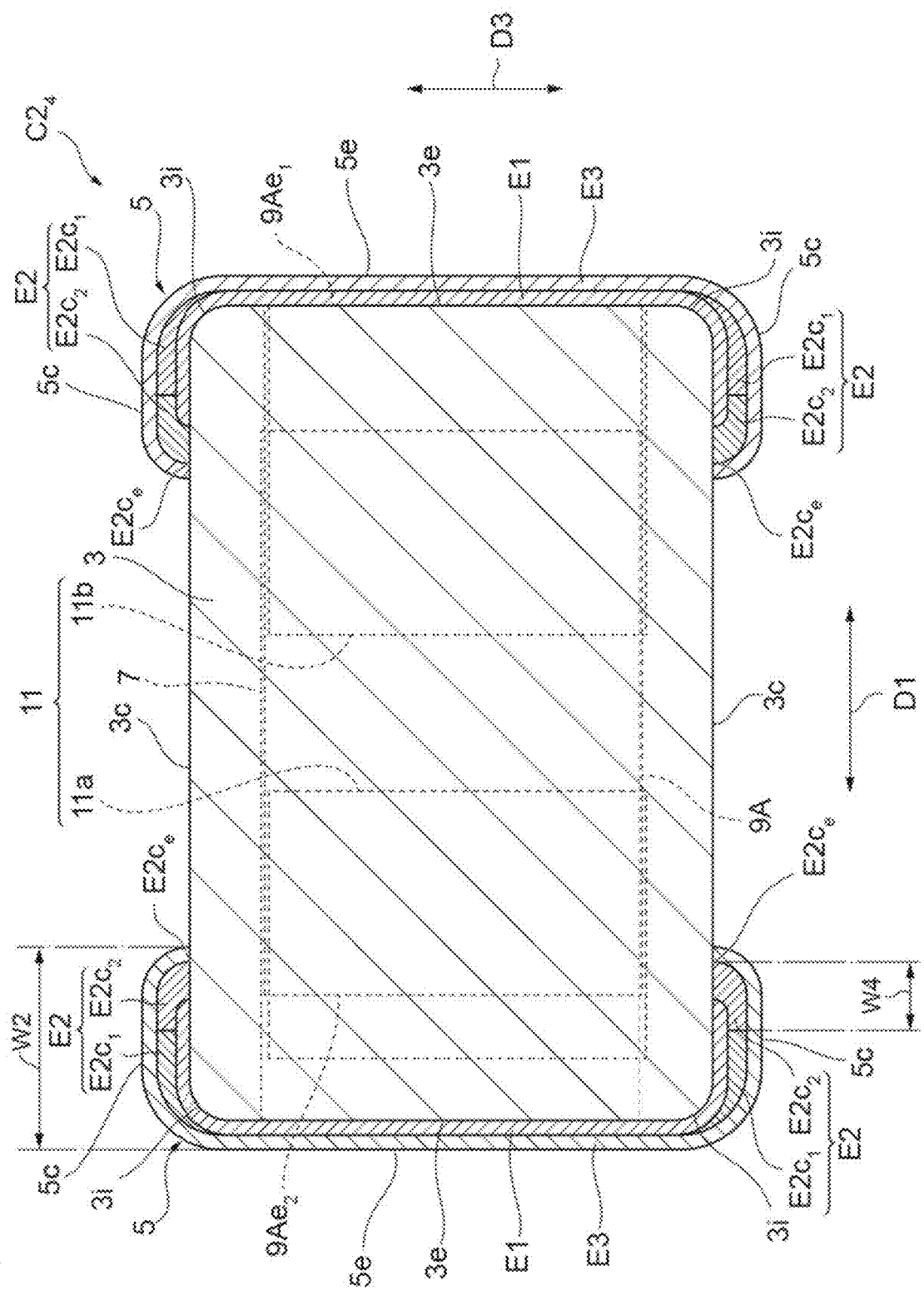
FIG. 29 is a view illustrating a cross-sectional configuration of the multilayer capacitor according to the modification of the second embodiment.
Figure 30:
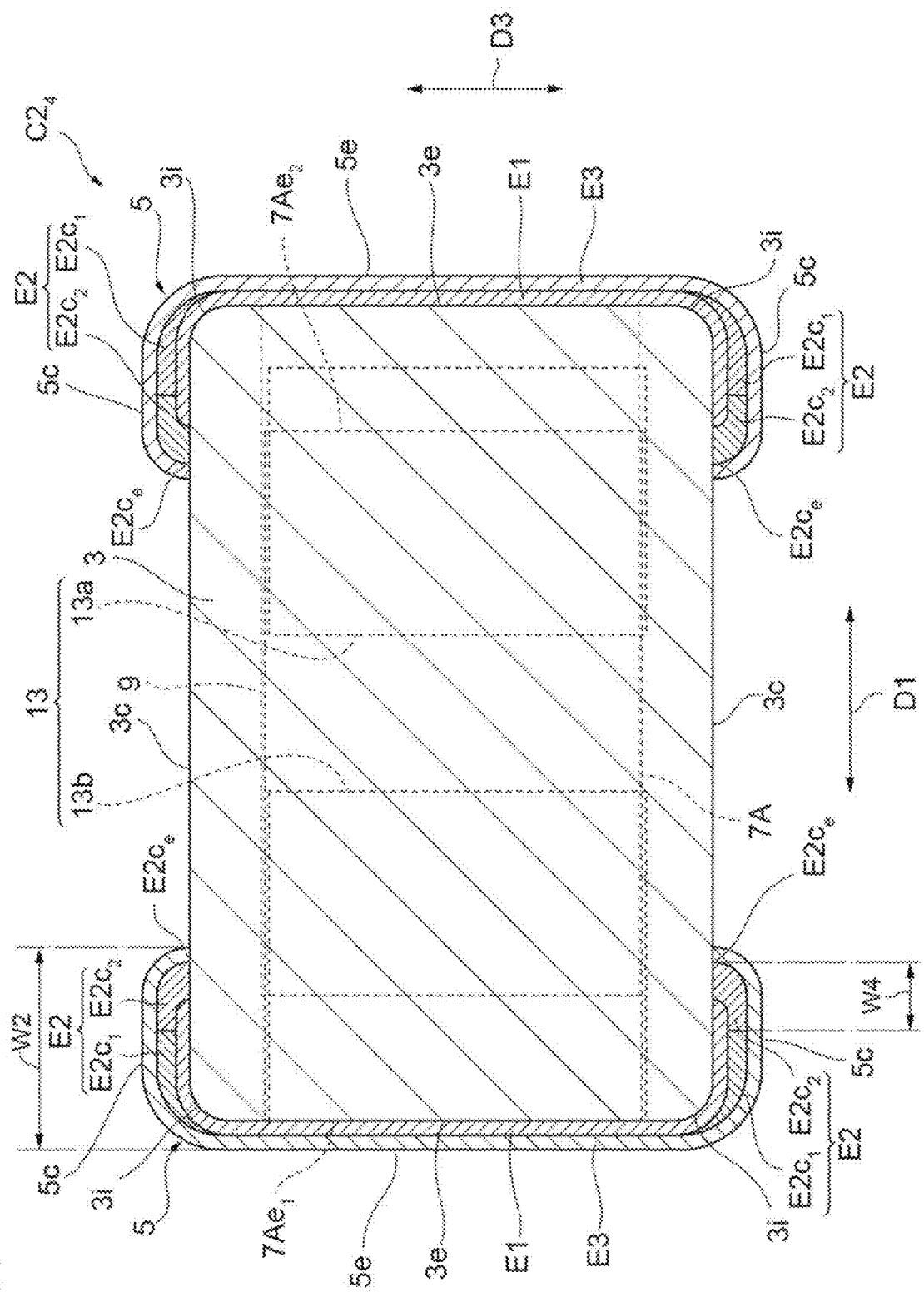
FIG. 30 is a view illustrating a cross-sectional configuration of the multilayer capacitor according to the modification of the second embodiment.

Next, a configuration of a multilayer capacitor $C2_4$ according to a modification of the second embodiment will be described with reference to FIGS. 28 to 30. FIGS. 28, 29, and 30 are views illustrating a cross-sectional configuration of a multilayer capacitor according to the modification of the second embodiment. The multilayer capacitor $C2_4$ according to this modification is generally similar to or the same as the multilayer capacitor $C2_3$ illustrated in FIGS. 25 to 27. However, this modification is different from the multilayer capacitor $C2_3$ in the configuration of the conductors 11 and 13. Hereinafter, differences between the multilayer capacitor $C2_3$ and this modification will be mainly described. This modification is similar to the multilayer capacitor $C1_4$ illustrated in FIGS. 12 to 14 in the configuration of the conductors 11 and 13.

The multilayer capacitor $C2_4$ includes a pair of conductors 11 and 13 similarly to the multilayer capacitor $C1_4$. In FIGS. 29 and 30, for the sake of explanation, the internal electrodes 7A and 9A and the conductors 11 and 13 are intentionally illustrated so as to deviate from each other in the third direction D3. Even in the multilayer capacitor $C2_4$, the conductors 11 and 13 constitute dummy conductors that tend not to contribute to generation of capacitance.

In the multilayer capacitor $C2_4$, similarly to the multilayer capacitor $C1_4$, the conductor 11 is located between the second electrode layer E2 and the internal electrode 7A that is not electrically connected to the second electrode layer E2. Therefore, even in a case where an electric field is generated between the second electrode layer E2 and the internal electrode 7A that is not electrically connected to the second electrode layer E2, strength of the electric field is small.

The conductor 13 is located between the second electrode layer E2 and the internal electrode 9A that is not electrically connected to the second electrode layer E2. Therefore, even in a case where an electric field is generated between the second electrode layer E2 and the internal electrode 9A that is not electrically connected to the second electrode layer E2, strength of the electric field is small.

Consequently, the multilayer capacitor $C2_4$ further controls the occurrence of the migration. Therefore, the second electrode layer E2 included in the electrode portion 5a may not include the region $E2a_2$. Although not illustrated, the second electrode layer E2 included in the electrode portion 5a may include the region $E2a_2$.

Figure 31:
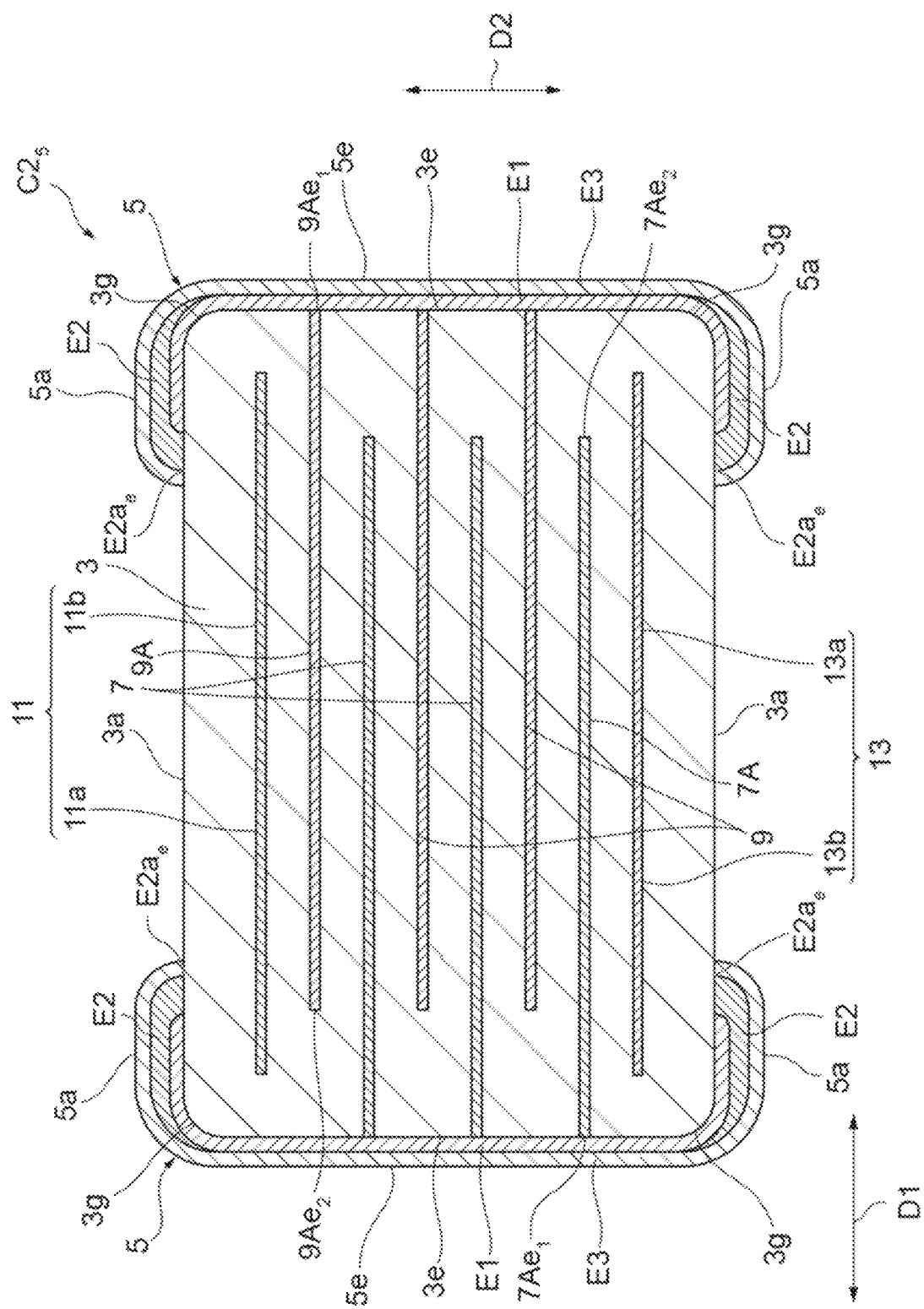
FIG. 31 is a view illustrating a cross-sectional configuration of a multilayer capacitor according to a modification of the second embodiment.
Figure 32:
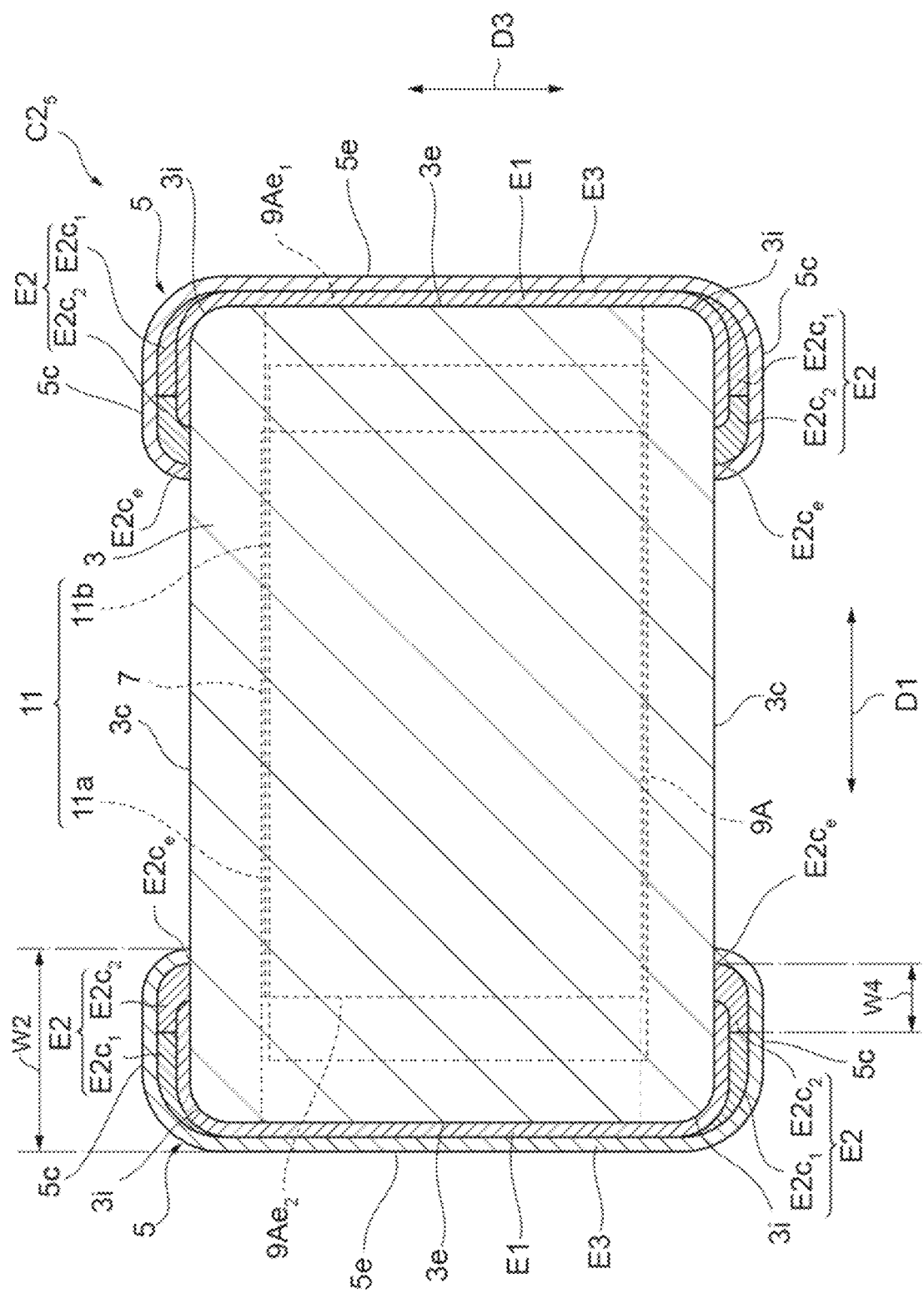
FIG. 32 is a view illustrating a cross-sectional configuration of the multilayer capacitor according to the modification of the second embodiment.

Next, a configuration of a multilayer capacitor $C2_5$ according to a modification of the second embodiment will be described with reference to FIGS. 31 to 33. FIGS. 31, 32, and 33 are views illustrating a cross-sectional configuration of a multilayer capacitor according to the modification of the second embodiment. The multilayer capacitor $C2_5$ according to this modification is generally similar to or the same as the multilayer capacitor $C2_4$ illustrated in FIGS. 28 to 30. However, this modification is different from the multilayer capacitor $C2_4$ in the configuration of the conductors 11 and 13. Hereinafter, differences between the multilayer capacitor $C2_4$ and this modification will be mainly described. This modification is similar to the multilayer capacitor $C1_5$ in the configuration of the conductors 11 and 13.

In the multilayer capacitor $C2_5$, the portion 11a and the portion 11b are integrated. The conductor 11 includes no end exposed to the surface of the element body 3. The conductor 11 is not connected to any of the external electrodes 5. The conductor 11 is not electrically connected to the second electrode layer E2.

The portion 13a and the portion 13b are integrated. The conductor 13 includes no end exposed to the surface of the element body 3. The conductor 13 is not connected to any of the external electrodes 5. The conductor 13 is not electrically connected to the second electrode layer E2.

In the multilayer capacitor $C2_5$, the second electrode layer E2 included in the electrode portion 5a may not include the region $E2a_2$. Although not illustrated, the second electrode layer E2 included in the electrode portion 5a may include the region $E2a_2$.

Although the embodiment and modifications of the present invention have been described above, the present invention is not necessarily limited to the embodiment and modifications, and the embodiment can be variously changed without departing from the scope of the invention.

In each of the modifications illustrated in FIGS. 8 to 19 and 24 to 33, the electrode portion 5e may include the second electrode layer E2, as in the modifications illustrated in FIGS. 7 and 23.

The multilayer capacitors $C1_3$ to $C1_6$ and $C2_3$ to $C2_5$ may not include the insulating film 21.

In the present embodiments and modifications, electronic components are the multilayer capacitors C1, $C1_1$ to $C1_6$, C2, and $C2_1$ to $C2_5$. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, or a multilayer composite component, or electronic components other than the multilayer electronic components.

What is claimed is:
1. An electronic component, comprising:
an element body of a rectangular parallelepiped shape including a pair of end surfaces opposing each other in a first direction, a pair of first side surfaces opposing each other in a second direction, and a pair of second side surfaces opposing each other in a third direction;
a plurality of external electrodes disposed on both ends of the element body in the first direction; and
a plurality of internal electrodes disposed in the element body to be distributed in the second direction and electrically connected to corresponding external electrodes of the plurality of external electrodes,
wherein each of the plurality of external electrodes includes a pair of first electrode portions disposed on the pair of second side surfaces and including a conductive resin layer,
for each of the two conductive resin layers located on the same second side surface, one conductive resin layer includes an edge opposing another conductive resin layer,
the conductive resin layer includes:
a first region including a plurality of metal particles of a first content and a resin; and
a second region including a plurality of metal particles of a second content smaller than the first content and a resin, and
the second region is located closer to the edge of the conductive resin layer than the first region, and includes the edge of the conductive resin layer.

2. The electronic component according to claim 1,
wherein each of the plurality of external electrodes includes a pair of second electrode portions disposed on the pair of first side surfaces and including a conductive resin layer,
for each of the two conductive resin layers located on the same first side surface, one conductive resin layer includes an edge opposing another conductive resin layer,
the conductive resin layer included in the second electrode portion includes:
a third region including a plurality of metal particles of a third content and a resin; and
a fourth region including a plurality of metal particles of a fourth content smaller than the third content and a resin, and
the fourth region is located closer to the edge of the conductive resin layer than the third region, and includes the edge of the conductive resin layer.

3. The electronic component according to claim 1, wherein the metal particles include silver particles.

4. The electronic component according to claim 1,
wherein each of the plurality of external electrodes includes a pair of second electrode portions disposed on the pair of first side surfaces and including a conductive resin layer,
for each of the two conductive resin layers located on the same first side surface, one conductive resin layer includes an edge opposing another conductive resin layer,
an outermost internal electrode located outermost in the second direction, of the plurality of internal electrodes, is adjacent in the second direction to the second electrode portion to which the outermost internal electrode is electrically connected, and
assuming that a plane including the end surface to which the outermost internal electrode is exposed is a reference plane, a first length of the outermost internal electrode in the first direction from the reference plane is larger than a second length in the first direction from the reference plane to the edge of the conductive resin layer electrically connected to the outermost internal electrode and included in the second electrode portion, and smaller than a third length from the reference plane to the edge of the conductive resin layer not electrically connected to the outermost internal electrode and included in the second electrode portion.

5. The electronic component according to claim 4, further comprising:
a dummy conductor located in the same layer as the outermost internal electrode and separated from the outermost internal electrode,
wherein the dummy conductor is electrically connected to the external electrode to which the outermost internal electrode located in the same layer as the dummy conductor is not electrically connected.

6. The electronic component according to claim 1, further comprising:
a pair of dummy conductors each adjacent to a corresponding first side surface of the pair of first side surfaces in the second direction,
wherein each of the plurality of external electrodes includes a pair of second electrode portions disposed on the pair of first side surfaces and including a conductive resin layer, and
each of the pair of dummy conductors opposes the conductive resin layer not electrically connected to the internal electrode adjacent to the dummy conductor in the second direction and included in the second electrode portion, in the second direction.

7. The electronic component according to claim 1,
wherein each of the plurality of external electrodes further includes an electrode portion disposed on the end surface and including a conductive resin layer.

* * * * *